United States Patent
Suzuki

(10) Patent No.: US 11,746,719 B2
(45) Date of Patent: Sep. 5, 2023

(54) INTERNAL COMBUSTION ENGINE CONTROL DEVICE

(71) Applicant: Hitachi Astemo, Ltd., Hitachinaka (JP)

(72) Inventor: Kunihiko Suzuki, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 0 days.

(21) Appl. No.: 17/923,657

(22) PCT Filed: Feb. 5, 2021

(86) PCT No.: PCT/JP2021/004250
§ 371 (c)(1),
(2) Date: Nov. 7, 2022

(87) PCT Pub. No.: WO2021/229873
PCT Pub. Date: Nov. 18, 2021

(65) Prior Publication Data
US 2023/0175450 A1    Jun. 8, 2023

(30) Foreign Application Priority Data

May 14, 2020   (JP) .................................. 2020-085299

(51) Int. Cl.
*F02D 41/14*        (2006.01)
*F01N 9/00*         (2006.01)
(Continued)

(52) U.S. Cl.
CPC ......... *F02D 41/1454* (2013.01); *F01N 9/005* (2013.01); *F01N 11/007* (2013.01);
(Continued)

(58) Field of Classification Search
CPC .... F01N 9/005; F01N 11/007; F02D 41/1454; F02D 41/1455; F02D 41/1456; F02D 41/1458
See application file for complete search history.

(56) References Cited

U.S. PATENT DOCUMENTS

| 6,079,205 A | 6/2000 | Yasui et al. |
| 2004/0139736 A1 | 7/2004 | Yoshizawa et al. |

(Continued)

FOREIGN PATENT DOCUMENTS

| JP | 11-93740 A | 4/1999 |
| JP | 2002-349325 A | 12/2002 |

(Continued)

OTHER PUBLICATIONS

International Search Report (PCT/ISA/210) issued in PCT Application No. PCT/JP2021/004250 dated Jun. 1, 2021 with English translation (six (6) pages).

(Continued)

*Primary Examiner* — Jonathan R Matthias
(74) *Attorney, Agent, or Firm* — Crowell & Moring LLP

(57) ABSTRACT

To keep medium purification efficiency at a high level and prevent deterioration of emission performance. An aspect of the present invention includes: a downstream equivalence ratio calculation unit that calculates a catalyst downstream exhaust gas equivalence ratio by using a catalyst statistical model that receives at least a detection value of an air-fuel ratio sensor on an upstream side of a catalyst and outputs a catalyst downstream exhaust gas equivalence ratio; an oxygen output calculation unit that calculates an output value of an oxygen sensor by using an oxygen sensor statistical model that receives the catalyst downstream exhaust gas equivalence ratio and outputs an output value of the oxygen sensor on the downstream side of the catalyst; a downstream equivalence ratio correction unit that corrects the catalyst downstream exhaust gas equivalence ratio calculated by the downstream equivalence ratio calculation unit based on a calculation result of the oxygen output calculation unit and the detection value of the oxygen sensor; and an air-fuel ratio control unit that controls an air-fuel ratio of an air-fuel (Continued)

mixture of an internal combustion engine based on the corrected catalyst downstream exhaust gas equivalence ratio and air-fuel ratio target value.

13 Claims, 20 Drawing Sheets

(51) Int. Cl.
 *F01N 11/00* (2006.01)
 *F02D 41/02* (2006.01)
 *F02D 41/26* (2006.01)
(52) U.S. Cl.
 CPC ..... *F02D 41/1441* (2013.01); *F02D 41/1473* (2013.01); *F02D 41/0235* (2013.01); *F02D 41/1445* (2013.01); *F02D 41/1446* (2013.01); *F02D 41/1459* (2013.01); *F02D 41/1495* (2013.01); *F02D 41/26* (2013.01)

(56) References Cited

U.S. PATENT DOCUMENTS

2007/0251213 A1 11/2007 Saito et al.
2022/0099043 A1 3/2022 Suzuki

FOREIGN PATENT DOCUMENTS

| JP | 2006-329005 A | 12/2006 |
| JP | 2007-292014 A | 11/2007 |
| JP | 2011-174426 A | 9/2011 |
| WO | WO 2020/189080 A1 | 9/2020 |

OTHER PUBLICATIONS

Japanese-language Written Opinion (PCT/ISA/237) issued in PCT Application No. PCT/JP2021/004250 dated Jun. 1, 2021 (three (3) pages).

POST-PROCESSING SYSTEM

INTERNAL COMBUSTION ENGINE CONTROL DEVICE

TECHNICAL FIELD

The present invention relates to an internal combustion engine control device.

BACKGROUND ART

Conventionally, there is known a control technique in which a three-way catalyst is provided in an exhaust pipe of an internal combustion engine, an oxygen storage state in the three-way catalyst is captured by exhaust gas sensors assembled before and after the three-way catalyst, and an air-fuel ratio of an air-fuel mixture is corrected according to a result of the capturing. In this control technique, the rich correction of the air-fuel ratio is determined on the basis of the oxygen storage state captured by the time integration of the amount of air taken into the engine and the product of the air-fuel ratio of the exhaust gas and the difference value between the theoretical air-fuel ratio. Furthermore, feedback correction of the air-fuel ratio control is performed by detecting the presence or absence of oxygen released downstream of the three-way catalyst by an exhaust gas sensor assembled downstream of the three-way catalyst (see, for example, PTL 1).

CITATION LIST

Patent Literature

PTL 1: JP 2011-174426 A

SUMMARY OF INVENTION

Technical Problem

Incidentally, there is a tendency that the frequency of motoring operation accompanied by fuel cut and engine stop due to idling stop increases due to the demand for reduction in fuel consumption of the internal combustion engine. Therefore, the oxygen storage state and temperature in the three-way catalyst cannot be accurately grasped, and there is a problem that the purification efficiency of the three-way catalyst deteriorates and emission performance deteriorates.

In the method described in PTL 1 in which the presence or absence of oxygen released downstream of the three-way catalyst is detected using an exhaust gas sensor and feedback correction of the air-fuel ratio control is performed, the oxygen storage state of the catalyst reaches the lower limit value or the upper limit value of the target control range at the time when the presence or absence of oxygen is detected. Therefore, there is a problem that the catalyst purification efficiency cannot be kept at a high level, and emission performance deteriorates.

In addition, there is a method in which the amount of oxygen stored in the catalyst during the motoring operation accompanied by fuel cut is estimated at the timing when the oxygen sensor output on the downstream side of the catalyst changes, and rich correction is performed at the time of restarting the firing operation on the basis of the fuel increase period according to the amount of oxygen. In this system, since a change in oxygen storage capacity accompanying catalyst deterioration cannot be considered, there is a problem that appropriate rich correction cannot be performed and emission performance deteriorates.

The present invention has been made in view of the above circumstances, and an object thereof is to keep catalyst purification efficiency at a high level and to prevent deterioration of emission performance.

Solution to Problem

In order to solve the above problems, an internal combustion engine control device according to an aspect of the present invention is an internal combustion engine control device including an exhaust purification catalyst provided in an exhaust pipe of an internal combustion engine, an air-fuel ratio sensor disposed upstream of the exhaust purification catalyst, and an oxygen sensor disposed downstream of the exhaust purification catalyst. This internal combustion engine control device includes: a downstream equivalence ratio calculation unit that calculates a catalyst downstream exhaust gas equivalence ratio using a catalyst statistical model that receives at least a detection value of an air-fuel ratio sensor and outputs the catalyst downstream exhaust gas equivalence ratio; an oxygen output calculation unit that calculates an output value of an oxygen sensor using an oxygen sensor statistical model that receives the catalyst downstream exhaust gas equivalence ratio and outputs an output value of the oxygen sensor; a downstream equivalence ratio correction unit that corrects the catalyst downstream exhaust gas equivalence ratio calculated by the downstream equivalence ratio calculation unit based on a calculation result of the oxygen output calculation unit and the detection value of the oxygen sensor; and an air-fuel ratio control unit that controls the air-fuel ratio of the air-fuel mixture of the internal combustion engine based on the corrected catalyst downstream exhaust gas equivalence ratio and air-fuel ratio target value.

Advantageous Effects of Invention

According to at least one aspect of the present invention, it is possible to keep catalyst purification efficiency at a high level and prevent deterioration of emission performance.

Objects, configurations, and effects other than those described above will be clarified by the following description of embodiments.

DESCRIPTION OF EMBODIMENTS

Figure 1:
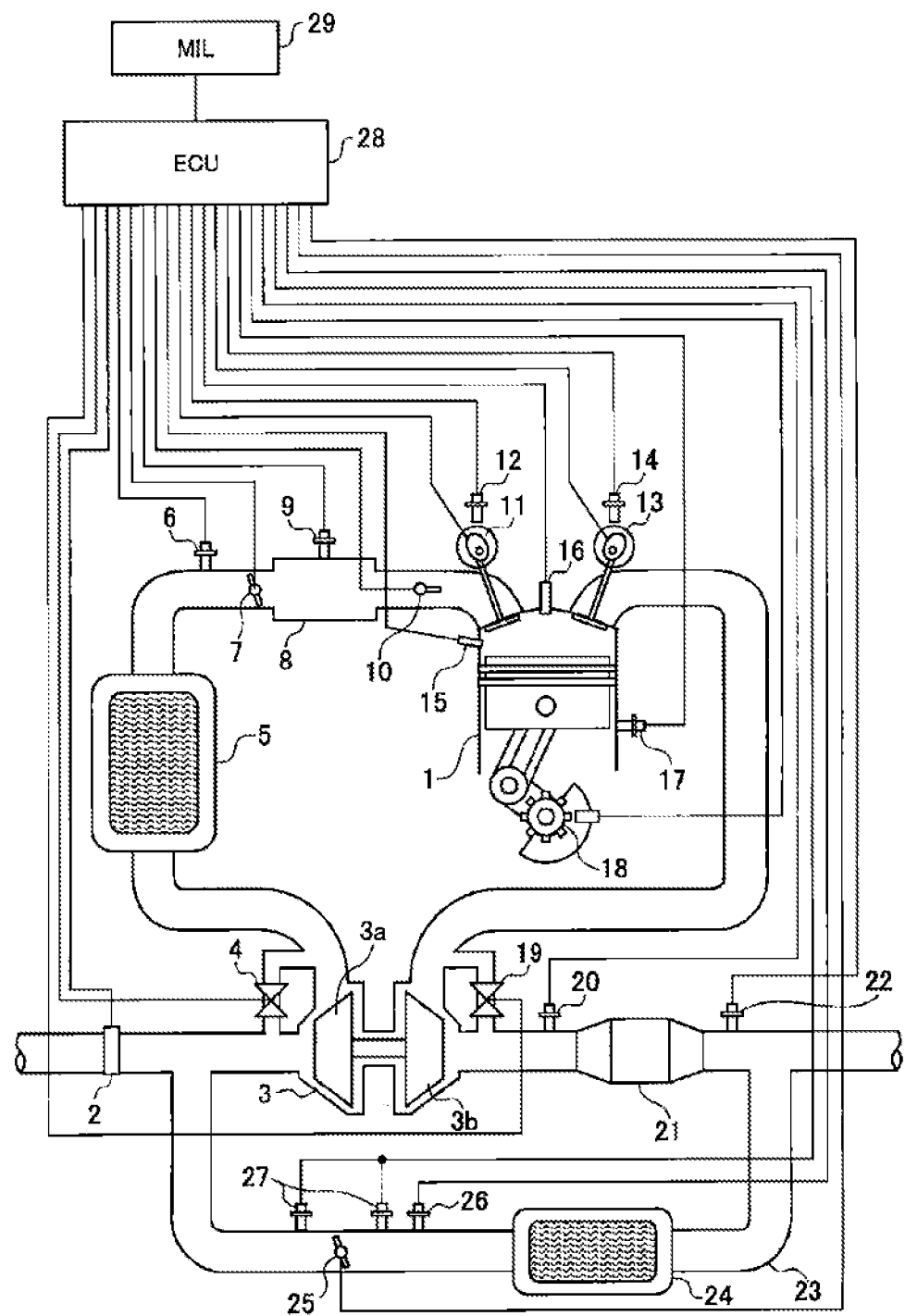
FIG. 1 is a schematic configuration diagram of an entire engine system to be controlled by an internal combustion engine control device according to an embodiment of the present invention.

Hereinafter, examples of modes for carrying out the present invention will be described with reference to the accompanying drawings. In the present specification and the accompanying drawings, components having substantially the same function or configuration are denoted by the same reference numerals, and redundant description is omitted.

Embodiment

[Schematic Configuration of Engine System]

First, a configuration example of an entire engine system to be controlled by an internal combustion engine control device according to an embodiment of the present invention will be described.

FIG. 1 is a schematic configuration diagram of an entire engine system to be controlled by an internal combustion engine control device according to an embodiment of the present invention. The engine system includes an internal combustion engine 1, a flow rate sensor 2, a turbocharger 3, an air bypass valve 4, an intercooler 5, a supercharging temperature sensor 6, a throttle valve 7, an intake manifold 8, a supercharging pressure sensor 9, a flow enhancing valve 10, an intake valve 11, an exhaust valve 13, a fuel injection valve 15, an ignition plug 16, a knock sensor 17, and a crank angle sensor 18. The engine system further includes a wastegate valve 19, an air-fuel ratio sensor 20, an exhaust purification catalyst 21, an oxygen sensor 22, an EGR (Exhausted Gas Recirculation) pipe 23, an EGR cooler 24, an EGR valve 25, a temperature sensor 26, a differential pressure sensor 27, and an ECU (Electronic Control Unit) 28.

An intake flow path and an exhaust flow path communicate with each other via the internal combustion engine 1. The flow rate sensor 2 and an intake air temperature sensor (not shown) built in the flow rate sensor 2 are assembled to the intake flow path. The turbocharger 3 includes a compressor 3a and a turbine 3b. The compressor 3a is connected to the intake flow path, and the turbine 3b is connected to the exhaust flow path. The turbine 3b of the turbocharger 3 converts the energy of the exhaust gas from the internal combustion engine 1 into the rotational energy of a turbine blade. The compressor 3a of the turbocharger 3 compresses the intake air flowing in from the intake flow path by rotation of a compressor blade connected to the turbine blade.

The intercooler 5 is provided downstream of the compressor 3a of the turbocharger 3, and cools the intake air temperature of the intake air that has been adiabatically compressed and increased by the compressor 3a. The supercharging temperature sensor 6 is assembled downstream of the intercooler 5 and measures the temperature (supercharging temperature) of the intake air cooled by the intercooler 5.

The throttle valve 7 is provided downstream of the intercooler 5, and narrows the intake flow path to control an intake air amount flowing into the cylinder of the internal combustion engine 1. The throttle valve 7 is configured by an electronically controlled butterfly valve capable of controlling a valve opening independently of an accelerator pedal depression amount by a driver. The intake manifold 8 to which the supercharging pressure sensor 9 is assembled communicates with the downstream side of the throttle valve 7.

Note that the intake manifold 8 provided downstream of the throttle valve 7 and the intercooler 5 may be integrated. In this case, since the volume from the downstream of the compressor 3a to the cylinder can be reduced, it is possible to improve the responsiveness and controllability of acceleration/deceleration.

The flow enhancing valve 10 is disposed downstream of the intake manifold 8, and enhances the turbulence of the flow inside the cylinder by generating a drift in the intake air sucked into the cylinder. When the exhaust gas recirculation combustion described later is performed, the turbulent flow combustion is promoted and stabilized by closing a flow enhancing valve (not shown).

The internal combustion engine 1 is provided with the intake valve 11 and the exhaust valve 13. Each of the intake valve 11 and the exhaust valve 13 has a variable valve mechanism for continuously changing a phase of valve opening and closing. An intake valve position sensor 12 and an exhaust valve position sensor 14 for detecting an opening/closing phase of the valve are respectively assembled to the variable valve mechanisms of the intake valve 11 and the exhaust valve 13. The cylinder of the internal combustion engine 1 includes a direct fuel injection valve 15 that directly injects fuel into the cylinder. The fuel injection valve 15 may be of a port injection type that injects fuel into the intake port.

In the cylinder of the internal combustion engine 1, the ignition plug 16 that exposes an electrode portion in the cylinder and ignites a combustible air-fuel mixture by a spark is assembled. The knock sensor 17 is provided in the cylinder block, and detects the presence or absence of knock by detecting cylinder block vibration caused by combustion pressure vibration generated in the combustion chamber. The crank angle sensor 18 is assembled to a crankshaft, and outputs a signal corresponding to a rotation angle of the crankshaft to an ECU 28 described later as a signal indicating a rotation speed.

The air-fuel ratio sensor 20 is provided downstream of the turbine 3b of the turbocharger 3, and outputs a signal indicating the detected exhaust gas composition, that is, the air-fuel ratio to the ECU 28. The exhaust purification catalyst 21 is, for example, a three-way catalyst, and is provided downstream of the air-fuel ratio sensor 20 to purify harmful exhaust gas components such as carbon monoxide, nitrogen compounds, and unburned hydrocarbon in the exhaust gas by a catalytic reaction. In general, platinum and rhodium, or a mixture of platinum and rhodium and palladium are used as the catalyst substance. The oxygen sensor 22 is provided downstream of the exhaust purification catalyst 21, and detects the presence or absence of oxygen contained in the exhaust gas after purification by the exhaust purification catalyst 21. Hereinafter, the exhaust purification catalyst 21 may be abbreviated as a "catalyst 21".

The turbocharger 3 includes the air bypass valve 4 and the wastegate valve 19. The air bypass valve 4 is disposed on a bypass flow path connecting the upstream and the downstream of the compressor 3a in order to prevent the pressure from excessively increasing from the downstream of the compressor 3a to the upstream of the throttle valve 7. When the throttle valve 7 is rapidly closed in the supercharged state, the air bypass valve 4 is opened according to the control of the ECU 28, whereby the compressed intake air downstream of the compressor 3a flows back to the upstream of the compressor 3a through the bypass flow path. As a result, by immediately decreasing the supercharging pressure, a phenomenon called surging can be prevented, and damage of the compressor 3a can be appropriately prevented.

The wastegate valve 19 is disposed on a bypass flow path connecting upstream and downstream of the turbine 3b. The wastegate valve 19 is an electric valve whose valve opening degree can be freely controlled with respect to supercharging pressure by control of the ECU 28. When the opening degree of the wastegate valve 19 is adjusted by the ECU 28 based on the supercharging pressure detected by the supercharging pressure sensor 9, a part of the exhaust gas passes through the bypass flow path, so that the work given to the turbine 3b by the exhaust gas can be reduced. As a result, the supercharging pressure can be held at the target pressure.

The EGR pipe 23 communicates an exhaust flow path downstream of the exhaust purification catalyst 21 and an intake flow path upstream of the compressor 3a, splits the exhaust gas from the downstream of the exhaust purification catalyst 21, and returns the exhaust gas to the upstream of the compressor 3a. The EGR cooler 24 provided in the EGR pipe 23 cools the exhaust gas. The EGR valve 25 is provided downstream of the EGR cooler 24 and controls the flow rate of the exhaust gas. The EGR pipe 23 is provided with the temperature sensor 26 that detects the temperature of the exhaust gas flowing upstream of the EGR valve 25 and the differential pressure sensor 27 that detects the differential pressure between upstream and downstream of the EGR valve 25.

The ECU 28 is an example of an internal combustion engine control device, and controls each component of the engine system and executes various types of data processing. The above-described various sensors and various actuators are communicably connected to the ECU 28. The ECU 28 controls operations of actuators such as the throttle valve 7, the fuel injection valve 15, the intake valve 11, the exhaust valve 13, and the EGR valve 25. In addition, the ECU 28 detects an operating state of the internal combustion engine 1 based on signals input from various sensors, and causes the ignition plug 16 to ignite at a timing determined according to the operating state. Further, when detecting abnormality or failure in the engine system including the internal combustion engine 1, the ECU 28 turns on the corresponding warning display lamp 29 (MIL).

[Hardware Configuration of ECU]

Figure 2:
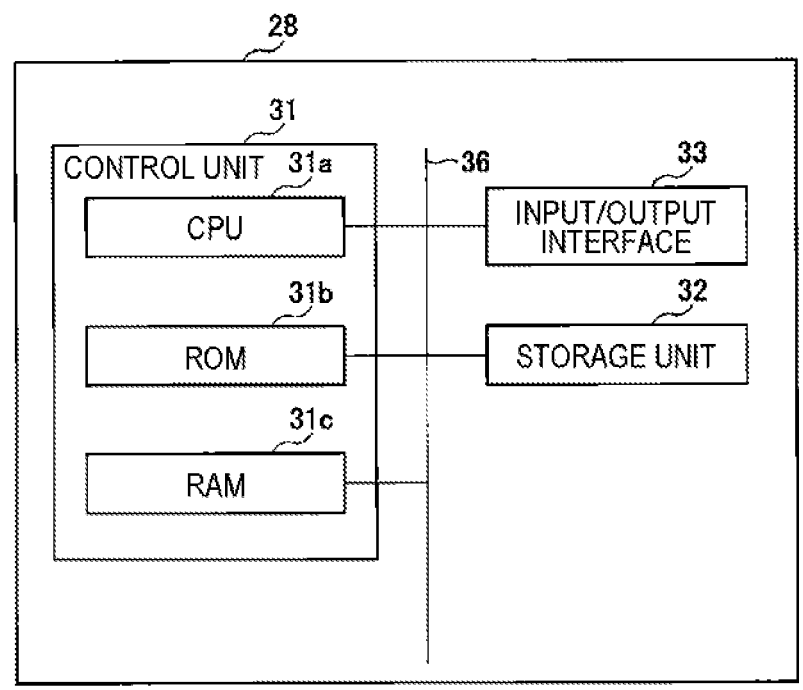
FIG. 2 is a block diagram showing a hardware configuration example of an ECU.

FIG. 2 is a block diagram showing a hardware configuration example of the ECU 28. The electronic control unit (ECU) 28 includes a control unit 31, a storage unit 32, and an input/output interface 33 connected to one another via a system bus. The control unit 31 includes a central processing unit (CPU) 31a, a read only memory (ROM) 31b, and a random access memory (RAM) 31c. The CPU 31a executes the control program stored in the ROM 31b to implement each function of the ECU 28.

The input/output interface 33 is an interface that communicates signals and data with each sensor and each actuator. The ECU 28 includes an analog/digital (A/D) converter (not shown) that processes input/output signals of each sensor, a driver circuit, and the like. The input/output interface 33 may also serve as an A/D converter. Although a central processing unit (CPU) is used as the processor, another processor such as a micro processing unit (MPU) may be used. In addition, the control program may be stored in the storage unit 32 which is an auxiliary storage device including a semiconductor memory or the like.

[Post-Processing System]

Figure 3:
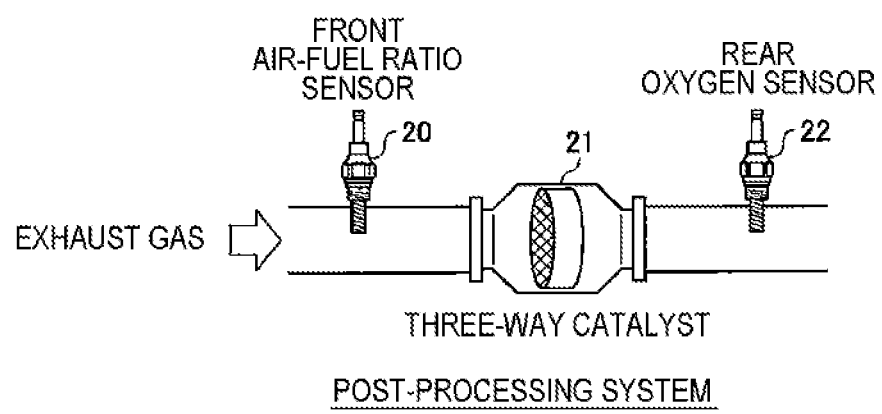
FIG. 3 is a diagram showing a configuration example of a post-processing system for purifying exhaust gas of an internal combustion engine.

FIG. 3 shows a configuration example of a post-processing system for purifying exhaust gas of the internal combustion engine 1. As the exhaust purification catalyst 21, a three-way catalyst is generally used. For the purpose of maintaining the purification efficiency of the three-way catalyst at an optimum point, sensors for detecting exhaust gas compositions are provided upstream and downstream of the three-way catalyst, respectively. In FIG. 3, the upstream side of the catalyst is referred to as "front", and the downstream side of the catalyst is referred to as "rear".

In the post-processing system shown in FIG. 3, the air-fuel ratio sensor 20 (in the drawing, the front air-fuel ratio sensor) is provided upstream of the catalyst 21, and the oxygen sensor 22 (in the drawing, a rear oxygen sensor) is provided downstream of the catalyst. According to this configuration, the air-fuel ratio of the exhaust gas flowing into the catalyst 21 (three-way catalyst) can be measured, and the presence or absence of oxygen contained in the exhaust gas after purification of the catalyst can be detected.

[Relationship Between Equivalence Ratio of Exhaust Gas and Output of Air-Fuel Ratio Sensor]

Figure 4:
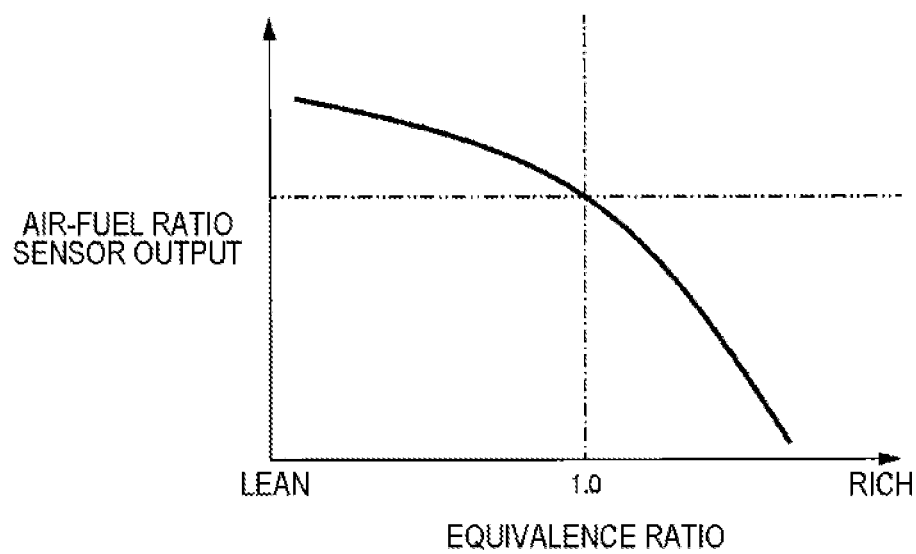
FIG. 4 is a diagram showing a relationship between an equivalence ratio of exhaust gas and an output of an air-fuel ratio sensor.
Figure 5:
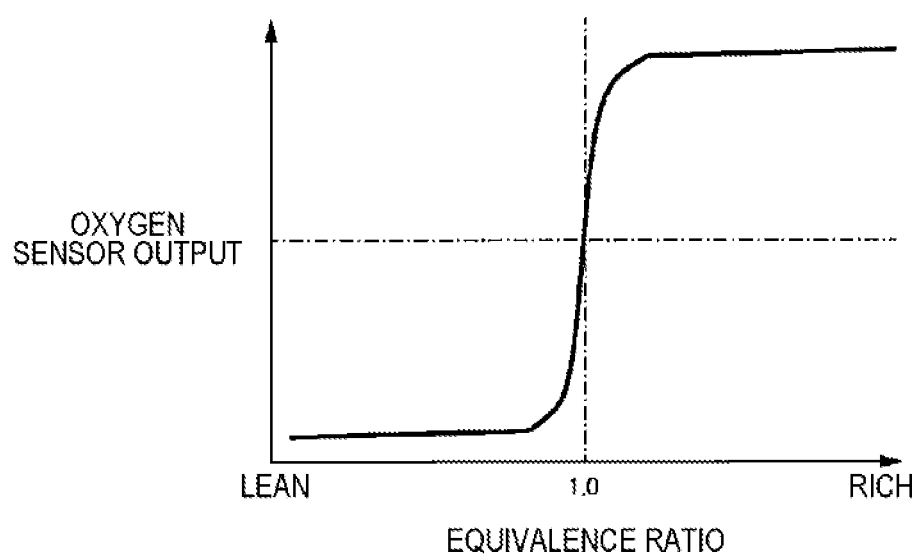
FIG. 5 is a diagram showing a relationship between an equivalence ratio of exhaust gas and an output of an oxygen sensor.

FIG. 4 is a diagram for explaining the relationship between the equivalence ratio (=[theoretical air-fuel ratio]/[air-fuel ratio]) of the exhaust gas and the output of the air-fuel ratio sensor. In FIG. 5, the horizontal axis represents the equivalence ratio, and the vertical axis represents the air-fuel ratio sensor output. The air-fuel ratio sensor output tends to decrease as the equivalence ratio increases (as the equivalence ratio becomes richer). The air-fuel ratio sensor is characterized in that the equivalence ratio can be accurately detected in a wide range from the lean state to the rich state for the exhaust gas by acquiring the information indicating the relationship of FIG. 5 in advance.

[Relationship Between Equivalence Ratio of Exhaust Gas and Output of Oxygen Sensor]

Figure 6:
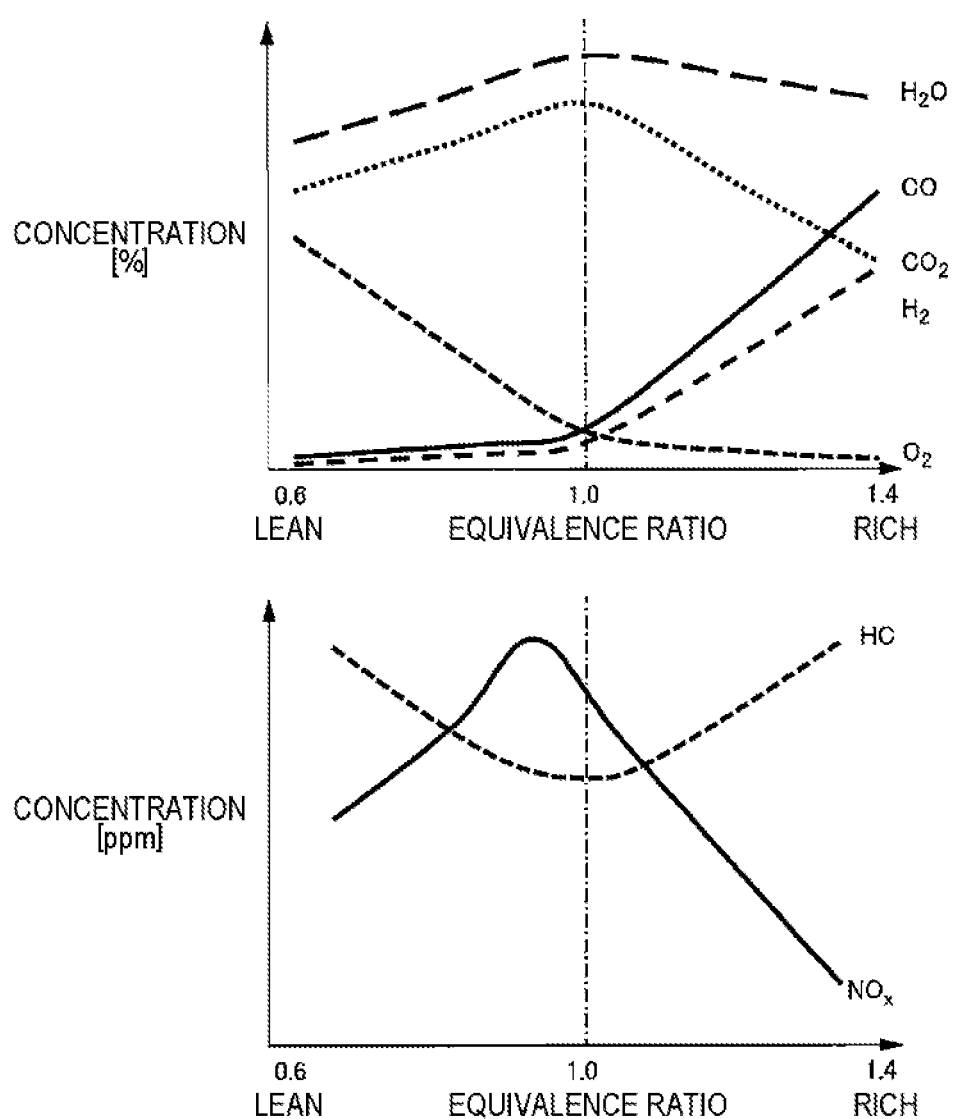
FIG. 6 is a diagram showing a tendency of a chemical species concentration of exhaust gas with respect to an equivalence ratio.

FIG. 5 is a diagram for explaining the relationship between the equivalence ratio of the exhaust gas and the output of the oxygen sensor. In FIG. 6, the horizontal axis represents the equivalence ratio, and the vertical axis represents the oxygen sensor output. The oxygen sensor output is represented by an electromotive force associated with a concentration difference between the oxygen concentration contained in the exhaust gas and the oxygen concentration in the air. In the lean condition, almost the minimum electromotive force is shown, and in the rich condition, the maximum electromotive force is shown. Therefore, the output has a characteristic of rapidly changing at the theoretical air-fuel ratio (equivalence ratio 1.0). A characteristic is that the exhaust gas equivalence ratio can be held in the vicinity of the theoretical air-fuel ratio by capturing the change timing of the oxygen sensor output and feeding back the change timing to the air-fuel ratio control.

[Tendency to Equivalence Ratio of Chemical Species Concentration of Exhaust Gas]

FIG. 6 shows the tendency of the chemical species concentration of the exhaust gas to the equivalence ratio. The horizontal axis of the upper graph of FIG. 6 represents the equivalence ratio, the vertical axis represents the concentration [%], the horizontal axis of the lower graph of FIG. 6 represents the equivalence ratio, and the vertical axis represents the concentration [ppm].

As shown in the upper graph of FIG. 6, the combustion gas composition of the hydrocarbon-based fuel shows a tendency that carbon monoxide (CO) and hydrogen ($H_2$) increase on the rich side and oxygen ($O_2$) increases on the lean side with the theoretical air-fuel ratio (equivalence ratio 1.0) as a boundary (upper graph of FIG. 6).

On the other hand, as shown in the lower graph of FIG. 6, the nitrogen oxide (NOx) shows a maximum value on a slightly lean side of the theoretical air-fuel ratio, and tends to decrease on a lean side and a rich side of the maximum value. Unburned hydrocarbon (HC) is a component that is released without reaching combustion, and there is no clear tendency with respect to the equivalence ratio, but when being excessively lean or rich, HC released without reaching normal combustion tends to increase.

In addition, even under the theoretical air-fuel ratio condition where fuel and air (oxygen) are supplied without excess or deficiency, CO and NOx are released in a certain amount without reaching water ($H_2O$) and carbon dioxide ($CO_2$) in a high-temperature combustion gas, and thus it is necessary to appropriately purify the exhaust gas by the post-processing system.

[Reaction Process of Three-Way Catalyst]

Here, main reaction processes of the three-way catalyst (ceria system) used in the post-processing system will be described.

The reaction process of the three-way catalyst mainly includes an oxidation reaction, an NOx reduction reaction, and an oxygen storage/release reaction. In the oxidation reaction, CO, $H_2$, and HC generated under rich or high temperature conditions react with oxygen to generate harmless $CO_2$ and $H_2O$. Unburned hydrocarbon (HC) contains components such as methane, propane, ethylene, and butane, and the reactions proceed at different rates (reaction formulas (1) to (3)). The NOx reduction reaction is represented mainly by the reaction between CO and NO and harmless $CO_2$ and $N_2$ are produced (reaction formula (4)). In the oxygen storage/release reaction, storage/release of oxygen and each oxidation/reduction reaction of HC, CO, and NO proceed via Ce (cerium) which is a catalyst material (reaction formulas (5) to (8)). Each reaction formula is expressed in the form of an elementary reaction formula.

(Oxidation Reaction)

$$CO + O_2 \rightarrow CO_2 \qquad (1)$$

$$H_2 + O_2 \rightarrow H_2O \qquad (2)$$

$$C_nH_m + O_2 \rightarrow CO_2 + H_2O \qquad (3)$$

(NOx Reduction Reaction)

$$CO + NO \rightarrow CO_2 + N_2 \qquad (4)$$

(Oxygen Storage and Release Reaction)

$$CeO_2 + CO \rightarrow Ce_2O_3 + CO_2 \qquad (5)$$

$$C_nH_m + CeO_2 \rightarrow Ce_2O_3 + CO + H_2O \qquad (6)$$

$$Ce_2O_3 + O_2 \rightarrow CeO_2 \qquad (7)$$

$$Ce_2O_3 + NO \rightarrow CeO_2 + N_2 \qquad (8)$$

As described above, harmless $CO_2$ and $H_2O$ are generated by the reaction of cerium dioxide ($CeO_2$) with CO and HC, and harmless $N_2$ is generated by the reaction of dicerium trioxide ($Ce_2O_3$) with NO. At this time, the oxygen storage ratio of the three-way catalyst is defined by the balance between $CeO_2$ and $Ce_2O_3$ generated simultaneously. That is, when all of $Ce_2O_3$ in the catalyst becomes $CeO_2$, a reaction with NO cannot be performed, and NO cannot be purified. Formula (9) for obtaining the oxygen storage ratio $\psi$ is shown below. The oxygen storage ratio $\psi$ can be defined by a ratio of the numbers of moles of $CeO_2$ and $Ce_2O_3$.

(Oxygen Storage Ratio)

$$\psi = [CeO_2]/([CeO_2] + [Ce_2O_3]) \qquad (9)$$

As described above, in order to appropriately maintain the purification efficiency of the three-way catalyst, it is necessary to maintain the balance between $CeO_2$ and $Ce_2O_3$, that is, the oxygen storage ratio at a predetermined value. All the above-described reaction processes strongly depend on the catalyst temperature, and it is necessary to appropriately control the catalyst temperature so that the temperature becomes equal to or higher than the activation temperature early after the engine is started.

In the engine system shown in the present embodiment, a ceria-based three-way catalyst is used, but the present invention is not limited thereto. Even in a catalyst using another material exhibiting a similar effect, the same effect can be exhibited without changing the configuration of the invention by adjusting the constant of the control model. In addition, in the catalytic reaction, an aqueous gas shift reaction or the like may be used in addition to the reaction mechanism described above, but these reaction mechanisms can also be handled by adjusting the constant of the control model.

[Purification Efficiency of Three-Way Catalyst with Respect to Exhaust Gas Equivalence Ratio]

Figure 7:
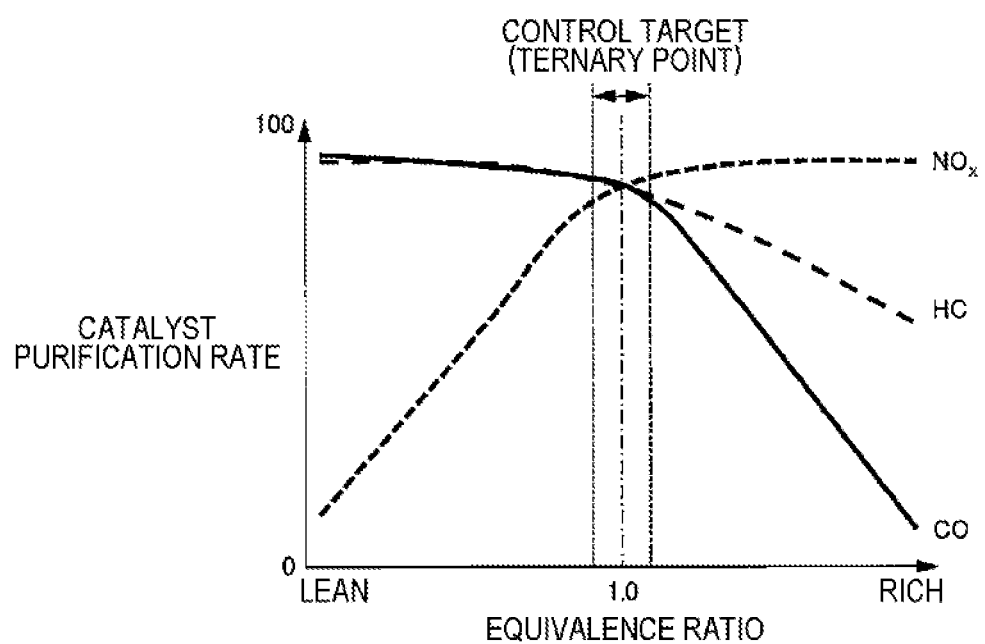
FIG. 7 is a diagram for explaining the tendency of the purification efficiency of a three-way catalyst with respect to the exhaust gas equivalence ratio at the catalyst activation temperature or higher.

FIG. 7 shows the tendency of the purification efficiency of the three-way catalyst with respect to the exhaust gas equivalence ratio at the catalyst activation temperature or higher. In FIG. 7, the horizontal axis represents the equivalence ratio, and the vertical axis represents the catalyst purification efficiency [%].

The purification efficiency characteristic of the three-way catalyst changes with a theoretical air-fuel ratio (equivalence ratio 1.0) as a boundary. Under the lean condition, while the purification efficiency of CO and HC is maintained at approximately 90% or more, the purification efficiency of NOx decreases as the equivalence ratio decreases. Under the rich condition, the purification efficiency of HC and CO tends to decrease as the equivalence ratio decreases. In the vicinity of the theoretical air-fuel ratio, the purification efficiency of 90% or more can be achieved for any of NOx, HC, and CO, and this point is referred to as a ternary point. In the three-way catalyst, control is performed to keep the purification efficiency at a high level by keeping the equivalence ratio near the theoretical air-fuel ratio (control target) including the ternary point.

[Variation of Equivalence Ratio and Output of Oxygen Sensor Downstream of Catalyst]

Figure 8:
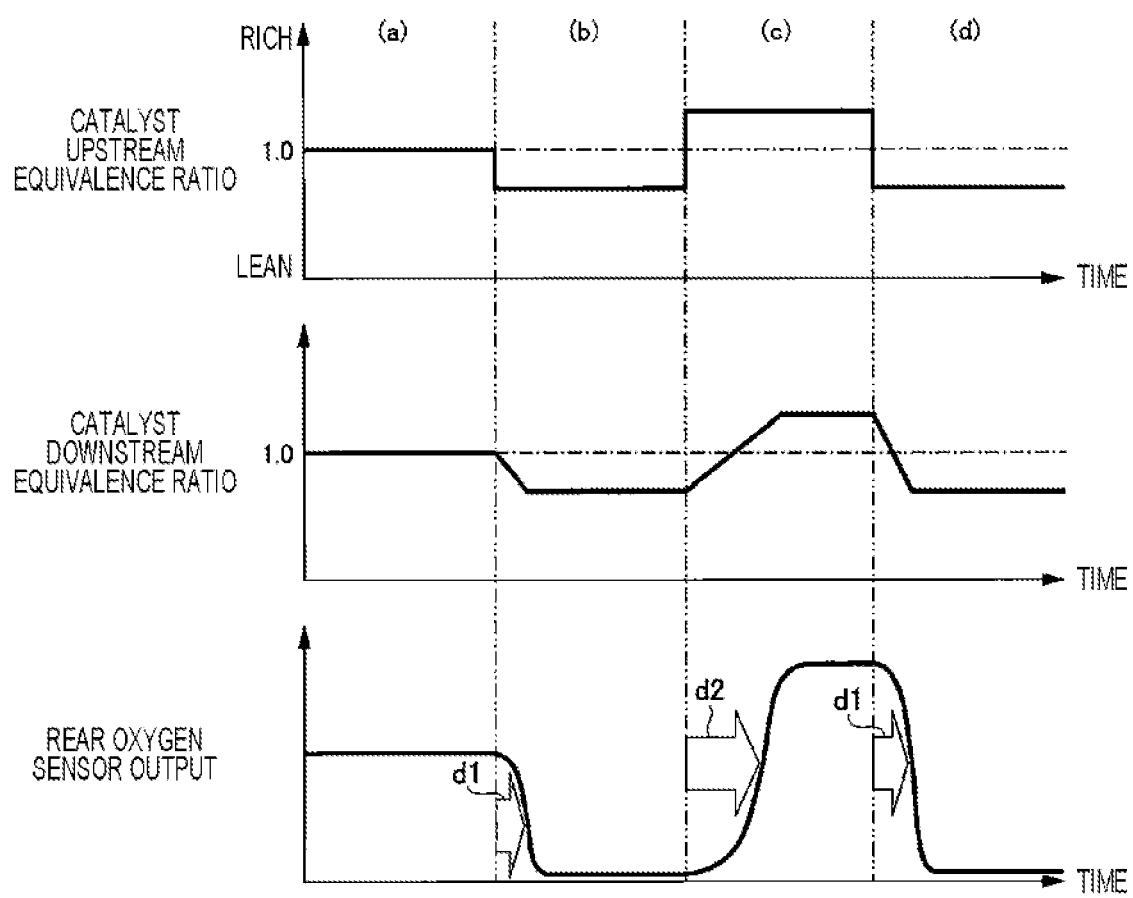
FIG. 8 is a diagram showing the air-fuel ratio on the downstream side of the catalyst and the output behavior of the rear oxygen sensor installed on the downstream side of the catalyst when the air-fuel ratio on the upstream side of the catalyst is varied stepwise to the lean side or the rich side with the equivalence ratio 1.0 as a center.

FIG. 8 shows the air-fuel ratio on the downstream side of the catalyst 21 and the output behavior of the oxygen sensor 22 installed on the downstream side of the catalyst 21 when the air-fuel ratio on the upstream side of the catalyst is changed stepwise to the lean side or the rich side with the equivalence ratio 1.0 as the center. In each graph of FIG. 8, the horizontal axis represents time, and the vertical axis represents the catalyst upstream equivalence ratio (upper graph), the catalyst downstream equivalence ratio (middle graph), and the rear oxygen sensor output (lower graph). In FIG. 8, the section is divided into sections (a) to (d) according to the lapse of time.

Even when the catalyst upstream equivalence ratio is set to the theoretical air-fuel ratio, a very small amount of oxygen is released downstream of the catalyst, so that the rear oxygen sensor output is maintained in the intermediate state. Then, when the catalyst upstream equivalence ratio is changed stepwise to the lean side ((a) to (b)), the catalyst downstream equivalence ratio gradually decreases, and the rear oxygen sensor output rapidly changes to the minimum value side after passing through the delay period d1. On the other hand, when the air-fuel ratio is changed from the lean side to the rich side ((b) to (c)), the catalyst downstream equivalence ratio gradually increases, and the rear oxygen sensor output exhibits hysteresis that rapidly changes with a larger delay period d2. In the present specification, the catalyst downstream equivalence ratio is also abbreviated as a "rear equivalence ratio".

As described above, the characteristic of the oxygen sensor is that the delay time tends to be different between the change from lean to rich and the change from rich to lean. This is because the reaction rates of $CeO_2$ and $Ce_2O_3$ described above are different. Since the reaction rate depends on the catalyst temperature and the exhaust gas flow rate, the hysteresis described above also changes depending on the catalyst temperature and the exhaust gas flow rate.

[Hysteresis of Oxygen Sensor Characteristics]

Figure 9:
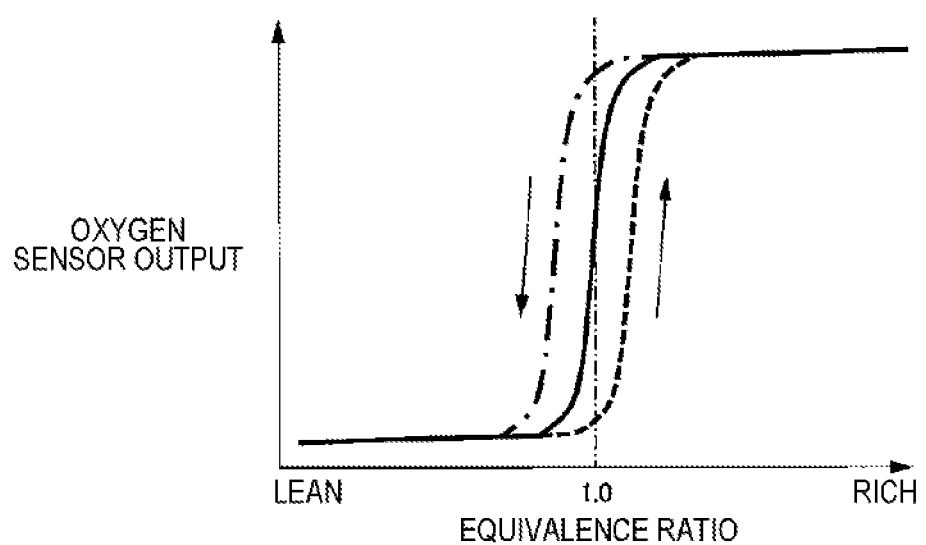
FIG. 9 is a diagram showing hysteresis of oxygen sensor characteristics.

FIG. 9 is a graph showing hysteresis of oxygen sensor characteristics. In FIG. 9, the horizontal axis represents the equivalence ratio, and the vertical axis represents the oxygen sensor output.

The static characteristics of the oxygen sensor are as described in FIG. 5. On the other hand, a catalyst material is also used for the oxygen sensor, and has hysteresis due to detection delay. That is, when the gas rapidly changes from the lean state to the rich state, the equivalence ratio (broken line) corresponding to the change timing of the oxygen sensor output shifts to the rich side. When the gas rapidly changes from the rich state to the lean state, the equivalence ratio (one-dot chain line) corresponding to the change timing of the oxygen sensor output shifts to the lean side. Furthermore, the behavior described above is affected by characteristic deterioration and temperature of the material constituting the oxygen sensor.

Therefore, in the control model of the present embodiment, it is desirable to consider not only the deterioration of the catalyst 21 but also the change in the dynamic characteristics of the entire post-processing system including the deterioration of the oxygen sensor 22 downstream of the catalyst 21 and the influence of the temperature.

[Oxygen Sensor Output and NOx Concentration after Fuel Cut Operation]

Figure 10:
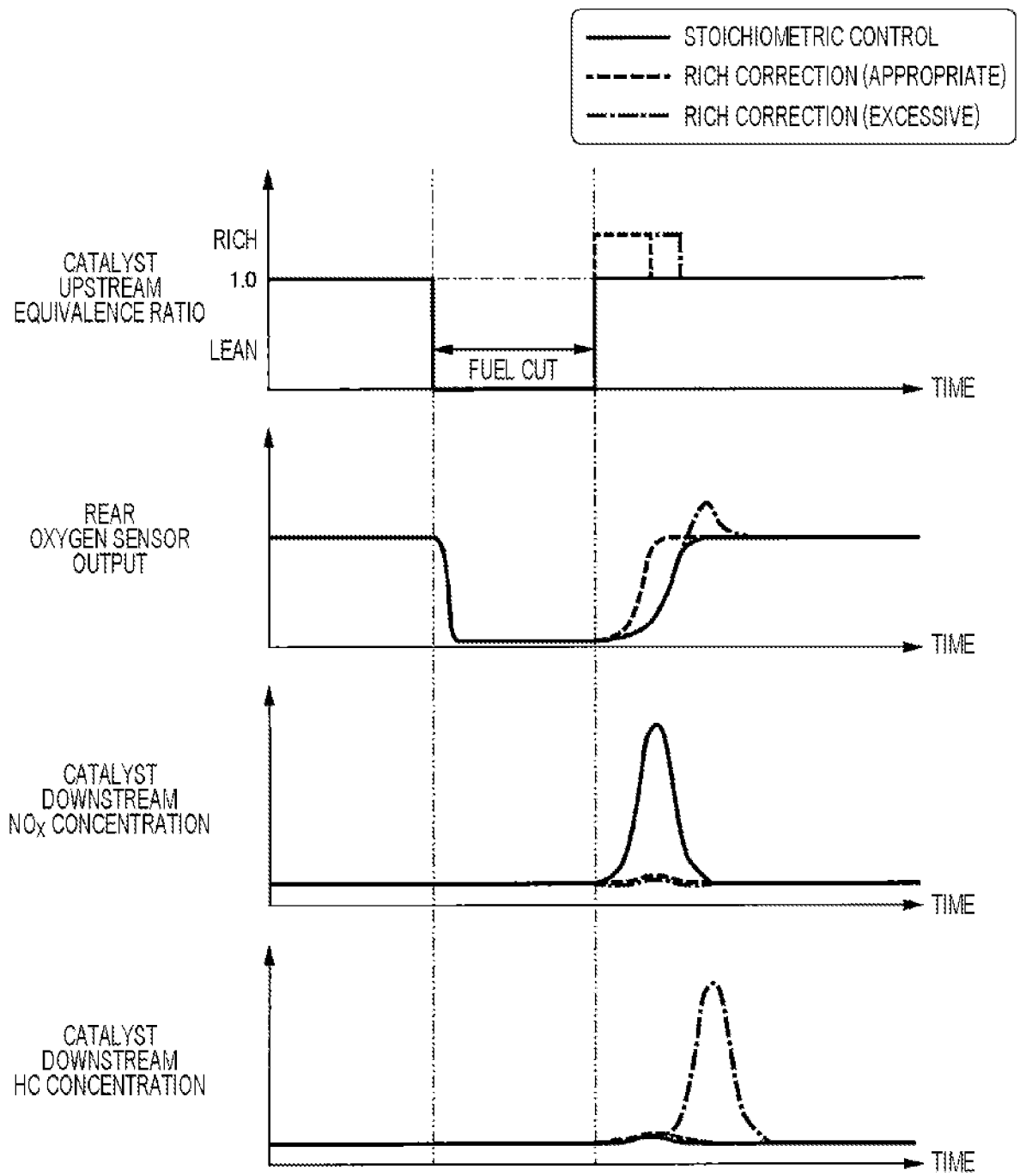
FIG. 10 is a diagram showing a temporal change of the output of the rear oxygen sensor and the NOx concentration in the downstream of the catalyst when the firing operation is performed again in the theoretical air-fuel ratio state after the motoring operation (fuel cut) period from the state of being controlled by the theoretical air-fuel ratio.

FIG. 10 shows temporal changes of the output of the rear oxygen sensor and the catalyst downstream NOx concentration when the firing operation is performed again in the theoretical air-fuel ratio state after the motoring operation (fuel cut) period from the state where the control is performed at the theoretical air-fuel ratio. In each graph of FIG. 10, the horizontal axis represents time, and the vertical axis represents the catalyst upstream equivalence ratio (first stage graph), the rear oxygen sensor output (second stage graph), the catalyst downstream NOx concentration (third stage graph), and the catalyst downstream HC concentration (fourth stage graph). In each graph, a solid line indicates a behavior during theoretical control, a broken line indicates a behavior after appropriate rich correction, and a one-dot chain line indicates a behavior after excessive rich correction.

When the fuel cut is performed, the ratio of $O_2$ sucked into the cylinder of the internal combustion engine 1 increases. When the firing operation using the theoretical air-fuel ratio is started again after the fuel cut, the rear oxygen sensor output increases with a delay from the minimum value as indicated by the solid line as described in FIG. 8. Then, the catalyst downstream NOx concentration increases in a spike manner during a delay period until the rear oxygen sensor output returns to the maximum value, and a large amount of NOx is released.

On the other hand, when the firing operation using the theoretical air-fuel ratio is started again after the fuel cut, if the theoretical air-fuel ratio control is performed after performing the rich correction (appropriate) of once changing the equivalence ratio indicated by the broken line to the rich side, NOx emission downstream of the catalyst can be prevented. In other words, NOx emission can be prevented by sucking a rich air-fuel mixture (large amount of fuel and small amount of $O_2$) into the cylinder of the internal combustion engine 1 before the rear oxygen sensor output changes from the minimum value.

Since the rear oxygen sensor detects the oxygen state of the exhaust gas downstream of the catalyst 21, the state of the inside of the catalyst 21 has already changed to the maximum or minimum state of the oxygen storage state at the time when the rear oxygen sensor reacts. Therefore, in the conventional control method in which the rich correction process is stopped after the reaction of the rear oxygen sensor, the control timing is too slow for the catalyst 21, and thus excessive rich correction is performed. When the rich correction is excessive, emission of harmful exhaust gas components (for example, HC) other than NOx cannot be appropriately prevented, and emission deteriorates. Therefore, in the air-fuel ratio control of the internal combustion engine 1, it is necessary to perform the rich correction process for an appropriate period in consideration of the state inside the catalyst 21 that cannot be directly observed from the outside.

[Degree of Catalyst Deterioration and Oxygen Storage Capacity]

Figure 11:
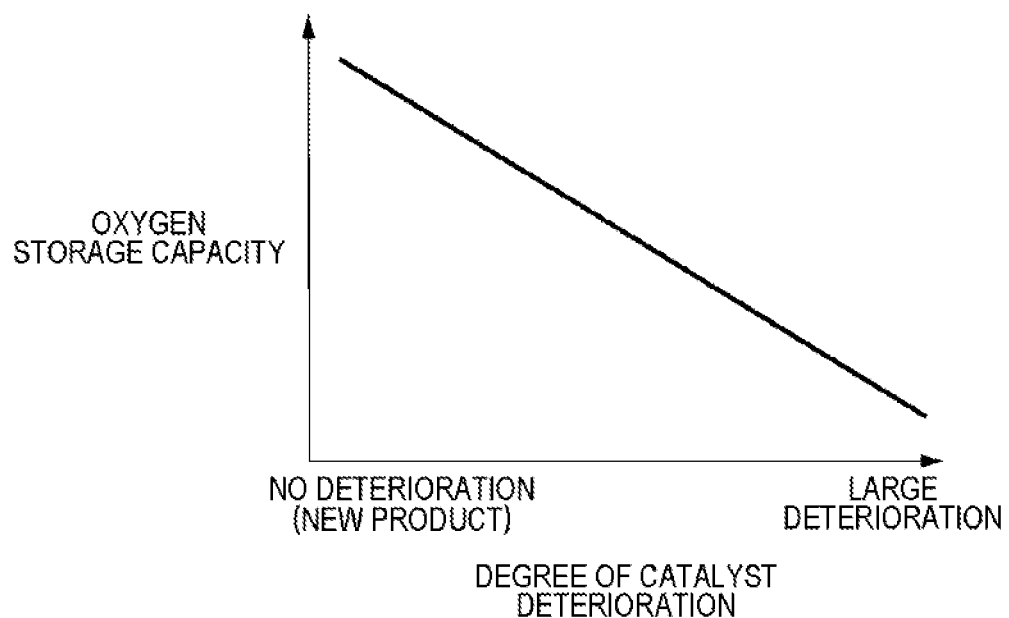
FIG. 11 is a diagram showing the relationship between the degree of deterioration of the three-way catalyst and the oxygen storage capacity.

FIG. 11 shows the relationship between the degree of deterioration of the three-way catalyst and the oxygen storage capacity. In FIG. 11, the horizontal axis represents the degree of catalyst deterioration, and the vertical axis represents the oxygen storage capacity. The catalyst deterioration refers to a state in which the catalytic action is reduced due to a thermal influence or an influence of poisoning by sulfur contained in the fuel. As shown in FIG. 11, in the three-way catalyst, the oxygen storage capacity tends to decrease as the deterioration progresses. Hereinafter, the influence of the change in oxygen storage capacity on the purification action of the three-way catalyst will be described.

[Relationship Between Oxygen Storage Ratio and NOx Purification Efficiency]

Figure 12:
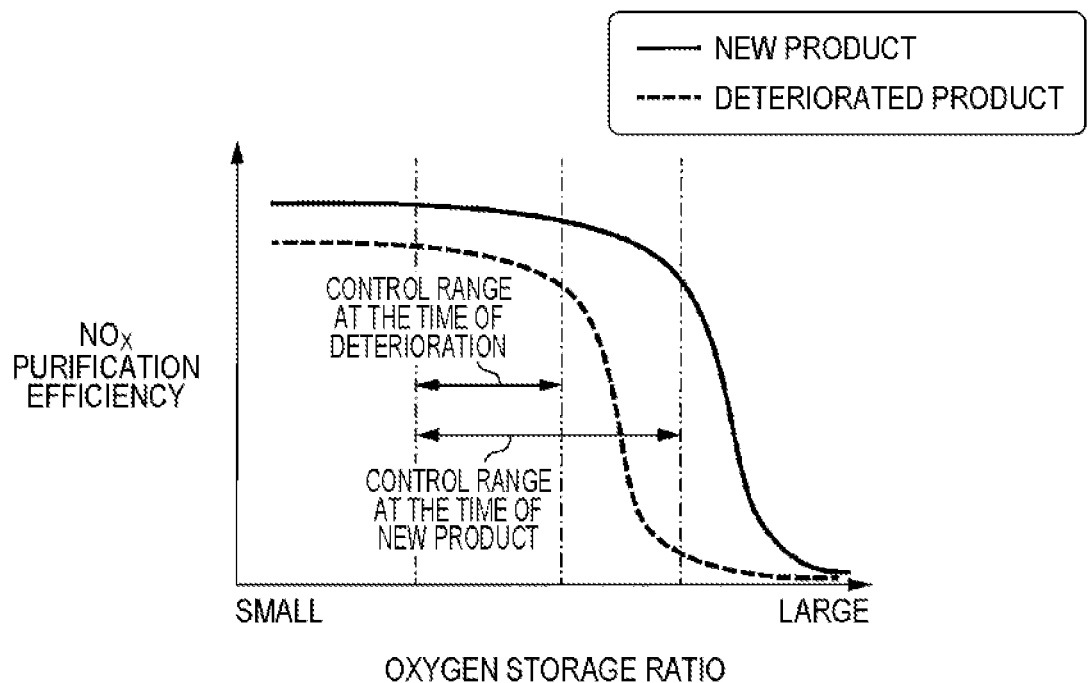
FIG. 12 is a diagram showing the relationship between the oxygen storage ratio and the NOx purification efficiency in the new catalyst and the deteriorated catalyst.

FIG. 12 shows the relationship between the oxygen storage ratio and the NOx purification efficiency in the new catalyst and the deteriorated catalyst. In FIG. 12, the horizontal axis represents the oxygen storage ratio, and the vertical axis represents the NOx purification efficiency. The solid line indicates the characteristics of the new catalyst, and the broken line indicates the characteristics of the deteriorated catalyst. When the oxygen storage amount is 100% with respect to the oxygen storage capacity, the oxygen storage ratio is 1.0.

In a new product and a deteriorated product, when the oxygen storage ratio exceeds each predetermined value, the NOx purification efficiency is significantly deteriorated. This is because, as described above, $Ce_2O_3$ in the catalyst is important for NOx purification, but when all of $Ce_2O_3$ reacts to change to $CeO_2$, a reaction between $Ce_2O_3$ and NO does not occur, and NO cannot be purified. Therefore, as described in FIG. 7, in order to keep the catalyst purification efficiency at a high level, it is necessary not only to keep the exhaust gas air-fuel ratio at the catalyst inlet at the ternary point but also to appropriately correct and control the exhaust gas air-fuel ratio at the catalyst inlet so that the oxygen storage ratio falls within a predetermined control range.

However, since the oxygen storage capacity is different between a new product and a deteriorated product, the oxygen storage ratio at which the NOx purification efficiency starts to significantly decrease is different. That is, the NOx purification efficiency of the deteriorated product is lower than that of the new product even if the oxygen storage ratio is the same. For this reason, the control range at the time of deterioration is narrower than the control range at the time of new product. Therefore, when correcting and controlling the exhaust gas air-fuel ratio at the catalyst inlet, it is desirable to note that the control range of the three-way catalyst differs according to the deterioration state of the three-way catalyst.

[Oxygen Storage Ratio and Oxygen Sensor Output when Equivalence Ratio is Varied]

Figure 13:
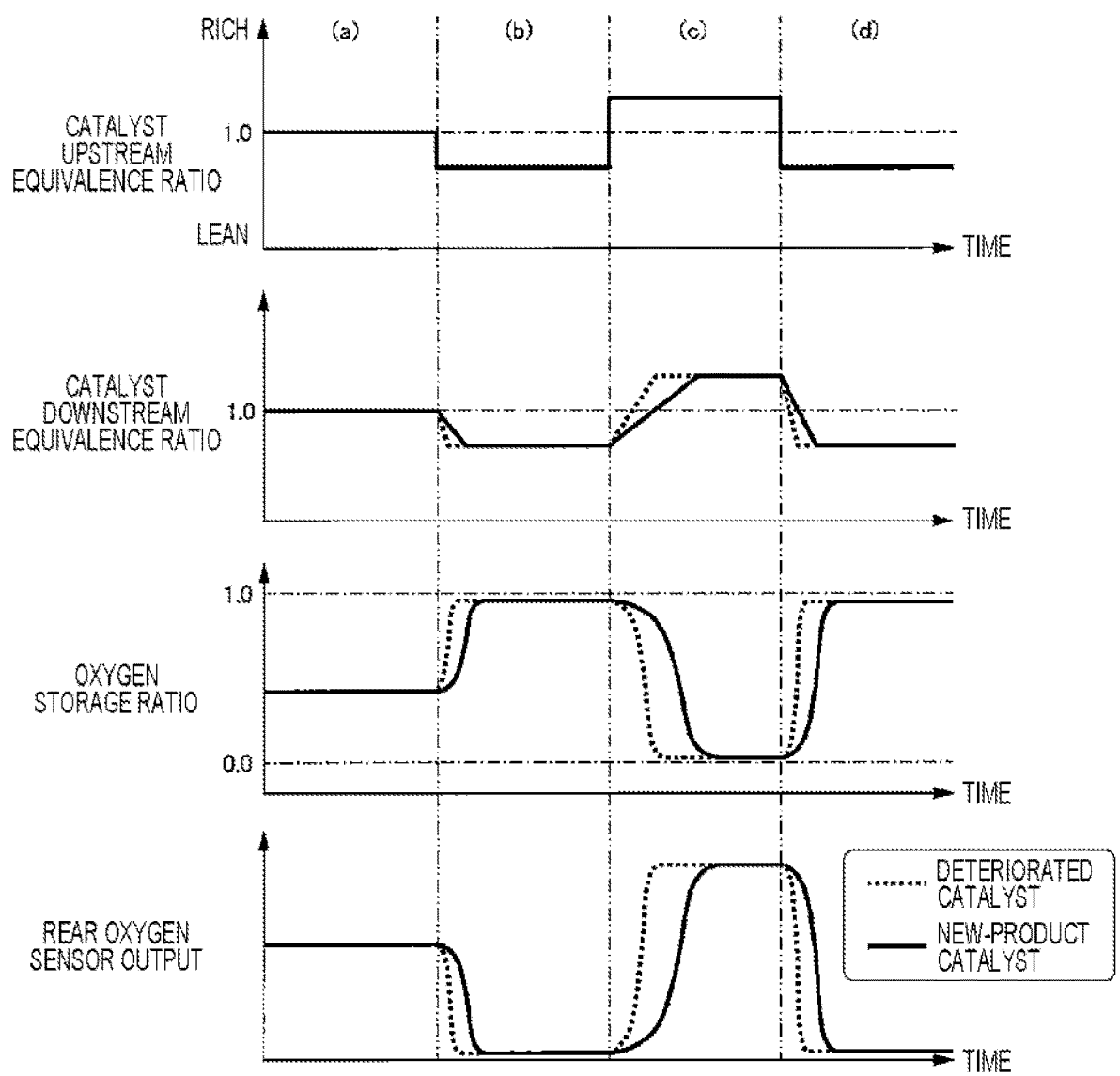
FIG. 13 is a diagram showing a comparison result of the output behavior of the air-fuel ratio sensor, the oxygen storage capacity, and the output behavior of the rear oxygen sensor when the air-fuel ratio is varied stepwise to the lean side or the rich side with the equivalence ratio of 1.0 as the center in the new catalyst and the deteriorated catalyst.

FIG. 13 shows a comparison result of the output behavior of the air-fuel ratio sensor, the oxygen storage capacity, and the output behavior of the rear oxygen sensor when the air-fuel ratio is temporally changed stepwise to the lean side or the rich side with respect to the equivalence ratio of 1.0 as the center in the new catalyst and the deteriorated catalyst. In each graph of FIG. 13, the horizontal axis represents time, and the vertical axis represents the catalyst upstream equivalence ratio (first stage graph), the catalyst downstream equivalence ratio (second stage graph), the oxygen storage ratio (third stage graph), and the rear oxygen sensor output (fourth stage graph). In each graph, the solid line indicates the behavior of the new catalyst, and the broken line indicates the behavior of the deteriorated catalyst.

In the deteriorated catalyst, the delay of the behavior of the rear oxygen sensor output with respect to the change in the air-fuel ratio between the lean and rich sides is reduced as compared with the new catalyst (fourth stage graph). This can be explained by the temporal transition of the oxygen storage ratio of the catalyst. That is, the oxygen storage capacity of the catalyst is reduced by the deterioration, and the oxygen storage ratio reaches the maximum value or the minimum value more quickly (third stage graph), so that the oxygen release behavior to the downstream of the catalyst is accelerated (second stage graph), and the delay in the behavior of the rear oxygen sensor output is reduced. Therefore, the rich correction period after recovery from the fuel cut described with reference to FIG. 10 needs to be set in consideration of the deterioration state of the catalyst.

[Control Model]

Next, functions used for constructing a control model for realizing the catalytic oxygen storage control will be described.

Figure 14:
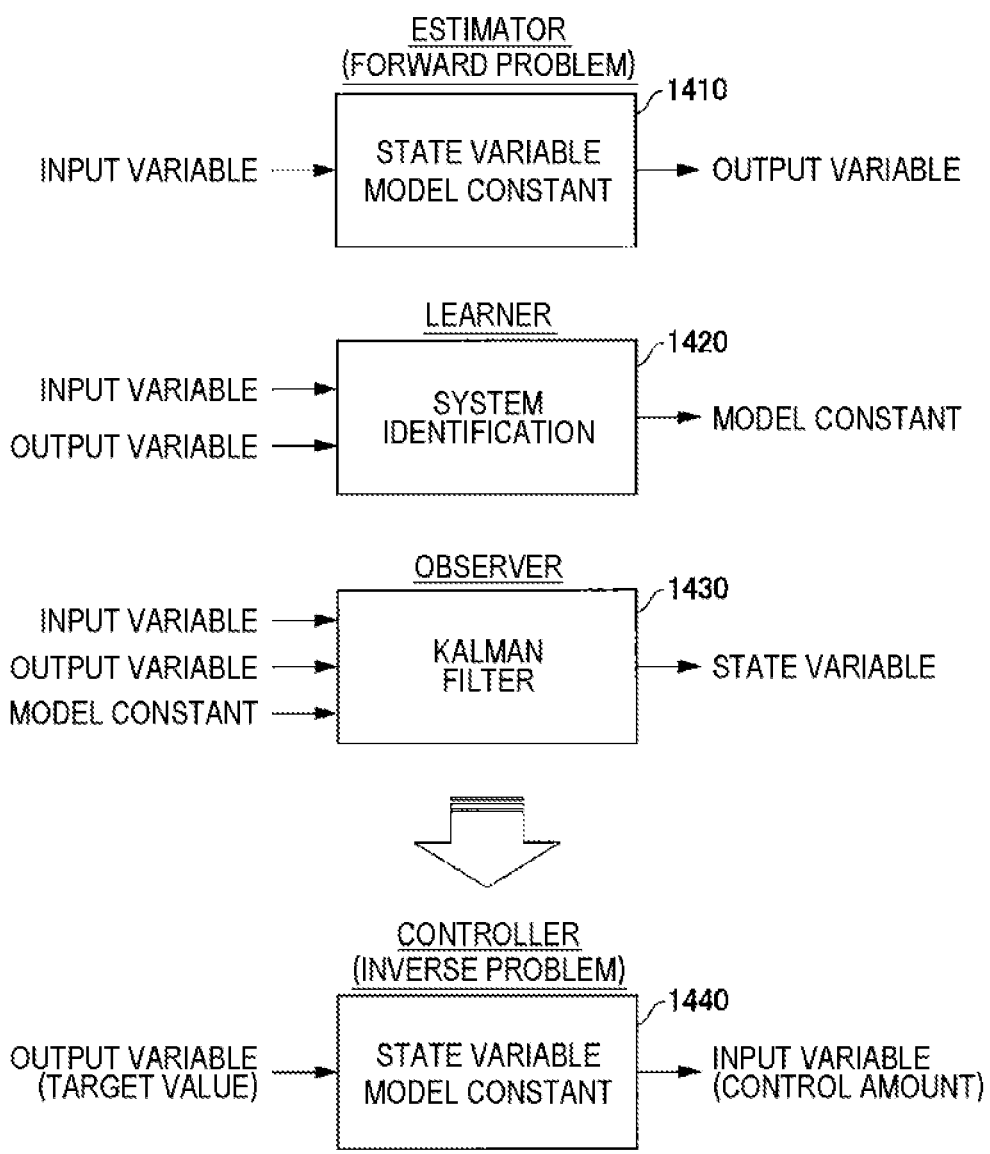
FIG. 14 is a diagram showing a construction example of a controller that realizes catalytic oxygen storage control according to an embodiment of the present invention.

FIG. 14 is a conceptual diagram showing functions used in constructing the control model in a block diagram.

An estimator 1410 obtains the output variable based on the input variable, the internal state variable model constant, and the static characteristic and the dynamic characteristic defined by the model constant. As a result, it is possible to estimate the output behavior and the behavior of the internal state with respect to the input.

The estimator 1410 describes the control target as a forward problem, whereas the control model (controller 1440) needs to solve an inverse problem. That is, the controller 1440 receives the output variable as a target value as an input and outputs an input variable (control amount) for realizing the target value. In deriving this controller 1440, the following several functional blocks are defined.

First, a learner 1420 can be constructed by switching the input/output relationship of the estimator 1410. The learner 1420 sets the input variable and the output variable as teacher data to the block input and outputs the model constant. In the present embodiment, the learner 1420 is realized using a sequential least squares algorithm.

Furthermore, the input/output relationship of the estimator 1410 is changed to construct an observer 1430. The observer 1430 can be constructed by setting the input variable, the output variable, and the model constant to the block input and outputting the state variable. One of methods for realizing the observer 1430 is a Kalman filter. In the present embodiment, the controller 1440 that realizes the catalytic oxygen storage control is constructed using the functions of the estimator 1410, the learner 1420, and the observer 1430.

[Configuration of Control Model]

Figure 15:
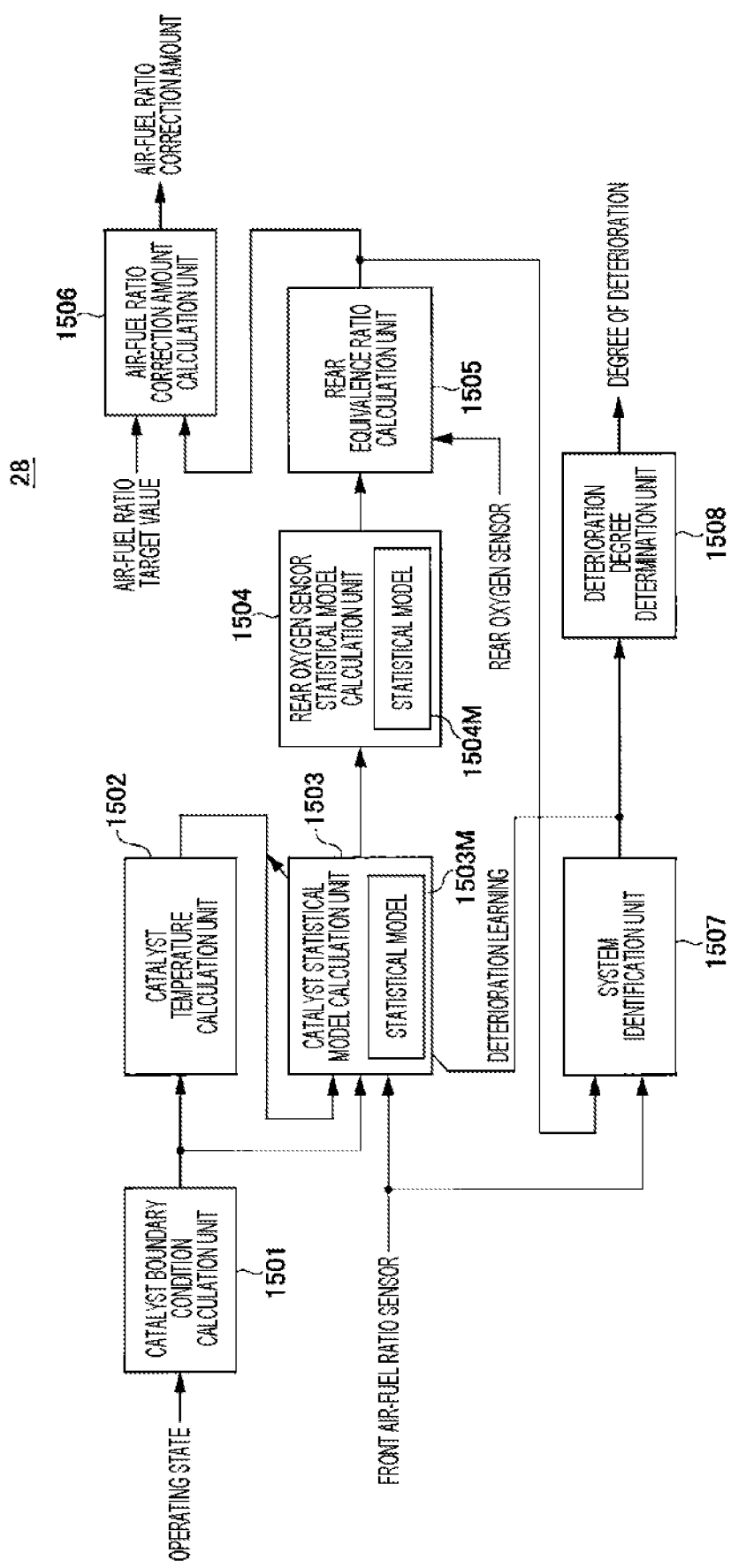
FIG. 15 is a block diagram showing a functional configuration example of a control model that performs correction control of an air-fuel ratio in consideration of a catalyst state.

FIG. 15 is a block diagram showing an internal configuration example of a control model for correcting and controlling the air-fuel ratio in consideration of the catalyst state. This control model is realized by the ECU 28. The ECU 28 includes a catalyst boundary condition calculation unit 1501, a catalyst temperature calculation unit 1502, a catalyst statistical model calculation unit 1503, a rear oxygen sensor statistical model calculation unit 1504, a rear equivalence ratio calculation unit 1505, an air-fuel ratio correction amount calculation unit 1506, a system identification unit 1507, and a deterioration degree determination unit 1508.

The catalyst boundary condition calculation unit 1501 calculates a catalyst boundary condition based on the operating state of the internal combustion engine 1. Examples of the catalyst boundary condition include a catalyst upstream exhaust gas temperature (hereinafter, referred to as an "exhaust gas temperature"), a catalyst upstream exhaust gas composition (hereinafter, referred to as an "exhaust gas air-fuel ratio"), a catalyst inflow exhaust gas flow rate (hereinafter, referred to as an "exhaust gas flow rate"), an atmospheric condition (outside air temperature and atmospheric pressure), and a vehicle speed. The calculation result of the catalyst boundary condition is input to the catalyst temperature calculation unit 1502 and the catalyst statistical model calculation unit 1503.

The catalyst temperature calculation unit 1502 calculates the temperature of the catalyst 21 based on the catalyst boundary condition calculated by the catalyst boundary condition calculation unit 1501. The calculation result of the catalyst temperature is input to the catalyst statistical model calculation unit 1503. By providing the catalyst temperature calculation unit 1502, the influence of the catalyst temperature change important in the catalytic reaction can be reflected in the air-fuel ratio control.

The catalyst statistical model calculation unit 1503 (an example of a downstream equivalence ratio calculation unit) performs calculation using a catalyst statistical model 1503M that receives the exhaust gas flow rate, the catalyst temperature, and the front air-fuel ratio sensor detection value as an input and outputs the catalyst downstream equivalence ratio as information corresponding to the catalytic oxygen storage ratio. The calculation result of the catalyst downstream equivalence ratio is input to the rear oxygen sensor statistical model calculation unit 1504.

In the present embodiment, the input parameters of the catalyst statistical model 1503M include at least the catalyst temperature and the exhaust gas flow rate. As described for the reaction process of the three-way catalyst using the formulas (1) to (8), each reaction process strongly depends on the catalyst temperature. Therefore, by using the catalyst temperature as an input parameter of the catalyst statistical model, it is possible to accurately calculate the rear equivalence ratio as information corresponding to the catalytic oxygen storage ratio.

The catalyst boundary condition calculation unit 1501, the catalyst temperature calculation unit 1502, and the catalyst statistical model calculation unit 1503 described above are positioned in the estimator 1410 (see FIG. 14). Tuning parameters are set in the catalyst statistical model 1503M, and the tuning parameters (catalyst statistical model 1503M) are always updated to the latest state by a front air-fuel ratio sensor detection value and a system identification algorithm to be described later. A specific configuration of the catalyst statistical model 1503M will be described later.

In the rear oxygen sensor statistical model calculation unit 1504 (an example of an oxygen output calculation unit), calculation is performed using the rear oxygen sensor statistical model 1504M having the catalyst downstream equivalence ratio as an input and the estimated value of the rear oxygen sensor output as an output. The calculation result of the estimated value of the rear oxygen sensor output is input to the rear equivalence ratio calculation unit 1505. At this time, the relationship shown in FIG. 11 in which the oxygen storage capacity decreases with respect to the progress of catalyst deterioration is considered. A specific configuration of the rear oxygen sensor statistical model 1504M will be described later.

The rear equivalence ratio calculation unit 1505 (an example of a downstream equivalence ratio correction unit) corrects the catalyst downstream equivalence ratio (rear equivalence ratio) in consideration of the state of the rear oxygen sensor statistical model 1504M of the rear oxygen sensor statistical model calculation unit 1504 based on the estimated value of the rear oxygen sensor output and the rear oxygen sensor detection value. In the present embodiment, a Kalman filter algorithm to be described later is used for the rear equivalence ratio calculation unit 1505. The calculation result of the rear equivalence ratio is input to the air-fuel ratio correction amount calculation unit 1506 and the system identification unit 1507. The rear oxygen sensor statistical model calculation unit 1504 and the rear equivalence ratio calculation unit 1505 are positioned in the observer 1430 (see FIG. 14).

The air-fuel ratio correction amount calculation unit 1506 calculates the air-fuel ratio correction amount based on the difference between the rear equivalence ratio corrected by the rear equivalence ratio calculation unit 1505 (Kalman filter) and the air-fuel ratio target value. The air-fuel ratio correction amount calculation unit 1506 corrects the rear equivalence ratio, which is information corresponding to the catalytic oxygen storage ratio, by the rear oxygen sensor detection value and the Kalman filter, and calculates the air-fuel ratio correction amount based on the corrected rear equivalence ratio. Therefore, in the present embodiment, the oxygen storage ratio in the catalyst can be more suitably maintained within a predetermined range as compared with the feedback control based on the rear oxygen sensor detection value. In this way, it is possible to maintain the purification efficiency of the catalyst at a high level and improve emission performance. The air-fuel ratio correction amount calculation unit 1506 is positioned in the controller 1440 (see FIG. 14).

Then, the control unit 31 corrects the air-fuel ratio control amount determined based on the operating state with the air-fuel ratio correction amount calculated by the air-fuel ratio correction amount calculation unit 1506, and calculates the target air-fuel ratio. By controlling the air-fuel ratio of the internal combustion engine 1 based on the target air-fuel ratio, the control unit 31 can maintain the catalyst purification efficiency at a high level to improve emission performance, and can also adapt to characteristic changes such as catalyst deterioration to prevent deterioration of emission performance.

In the system identification unit 1507, based on the catalyst downstream equivalence ratio corrected by the rear equivalence ratio calculation unit 1505 (Kalman filter) and the front air-fuel ratio sensor detection value, the tuning parameter of the catalyst statistical model 1503M included in the catalyst statistical model calculation unit 1503 is sequentially updated (learned) by the system identification algorithm.

As described above, the internal combustion engine control device (ECU 28) according to the present embodiment includes the catalyst statistical model learning unit (system identification unit 1507) that learns the parameter of the catalyst statistical model (catalyst statistical model 1503M) based on the detection value of the air-fuel ratio sensor (air-fuel ratio sensor 20) on the upstream side of the catalyst and the catalyst downstream exhaust gas equivalence ratio corrected by the rear equivalence ratio calculation unit (rear equivalence ratio calculation unit 1505).

With such a configuration, the catalytic reaction characteristics that change due to deterioration can be sequentially reflected in the tuning parameters, and the calculation accuracy of the catalyst statistical model 1503M can be kept at a high level. Therefore, it is possible to prevent deterioration of emission performance by adapting to a change in catalyst characteristics such as catalyst deterioration. The system identification unit 1507 is positioned in the learner 1420 (see FIG. 14).

The deterioration degree determination unit 1508 determines the degree of catalyst deterioration based on the tuning parameters input from the system identification unit 1507. As a result, when the catalyst reaches a deterioration state of a predetermined value or more, a diagnosis result can be output to the outside. The deterioration degree can also be used as information for the predictive diagnosis service.

[Catalyst Boundary Condition Calculation Unit]

Figure 16:
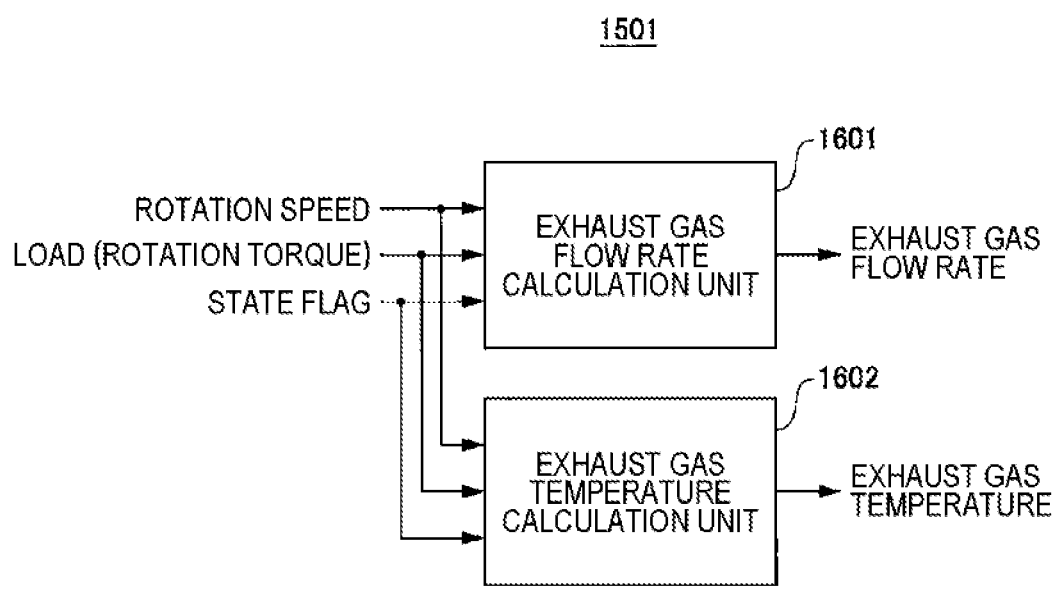
FIG. 16 is a block diagram showing calculation contents of a catalyst boundary condition in a catalyst boundary condition calculation unit shown in FIG. 15.

FIG. 16 is a block diagram showing calculation contents of the catalyst boundary condition in the catalyst boundary condition calculation unit shown in FIG. 15. The catalyst boundary condition calculation unit 1501 includes an exhaust gas flow rate calculation unit 1601 and an exhaust gas temperature calculation unit 1602.

The exhaust gas flow rate calculation unit 1601 calculates the exhaust gas flow rate based on the rotation speed, the load (rotational torque), and the state flag of the internal combustion engine 1. Similarly, the exhaust gas temperature calculation unit 1602 calculates the exhaust gas temperature based on the rotation speed, the load, and the state flag of the internal combustion engine 1. Note that a temperature sensor may be provided upstream or downstream of the catalyst 21, and the exhaust gas temperature may be detected by the temperature sensor.

The state flag is information for determining a control state such as fuel cut or ignition retard. In the cold start mode, catalyst temperature rise control is performed by ignition retard, intake air increase, and the like. In an internal combustion engine having a sailing stop control function or an internal combustion engine for a hybrid vehicle, a motoring state due to fuel cut frequently occurs, and in this case, air corresponding to atmospheric temperature passes through the catalyst. As described above, since the catalyst upstream temperature is affected by various control states, the catalyst state can be calculated with high accuracy by considering these state transitions.

[Catalyst Temperature Calculation Unit]

Figure 17:
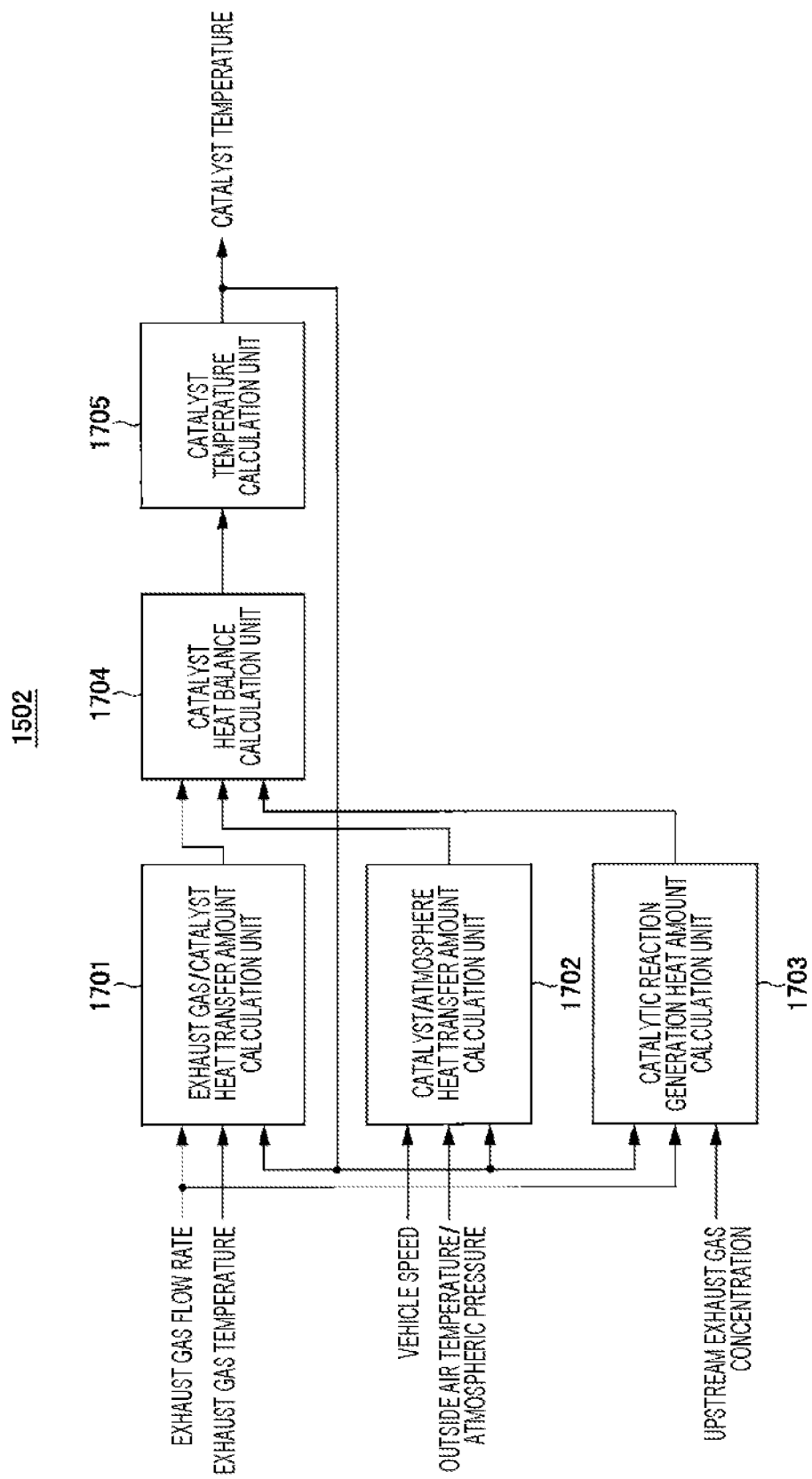
FIG. 17 is a block diagram showing calculation contents of a catalyst temperature in the catalyst temperature calculation unit shown in FIG. 15.

FIG. 17 is a block diagram showing calculation contents of the catalyst temperature in the catalyst temperature calculation unit 1502 shown in FIG. 15. The catalyst temperature calculation unit 1502 includes an exhaust gas/catalyst heat transfer amount calculation unit 1701, a catalyst/atmosphere heat transfer amount calculation unit 1702, a catalytic reaction generation heat amount calculation unit 1703, a catalyst heat balance calculation unit 1704, and a catalyst temperature calculation unit 1705.

The exhaust gas/catalyst heat transfer amount calculation unit 1701 calculates the heat transfer amount between the exhaust gas and the catalyst 21 based on the exhaust gas flow rate and the exhaust gas temperature calculated by the catalyst boundary condition calculation unit 1501 and the past catalyst temperature value. The heat transfer amount can be accurately calculated by considering the exhaust gas flow rate and the exhaust gas temperature, which are main factors of the turbulent heat transfer.

The catalyst/atmospheric heat transfer amount calculation unit 1702 calculates the heat transfer amount between the catalyst 21 and the atmosphere based on the vehicle speed, the outside air temperature and the atmospheric pressure, and the past catalyst temperature values. Regarding heat transfer around the catalyst 21, a forced convection phenomenon is dominant when the vehicle speed is large, and a natural convection phenomenon is dominant when the vehicle speed is small or in a stopped state. By considering such a change in the heat transfer mechanism based on the vehicle speed information, the heat transfer amount around the catalyst 21 can be accurately calculated.

The catalytic reaction generation heat amount calculation unit 1703 calculates the heat amount generated by the catalytic reaction based on the exhaust gas flow rate, the past catalyst temperature value, and the upstream exhaust gas concentration calculated by the catalyst boundary condition calculation unit 1501. The inside of the catalyst 21 is affected by heat generation due to the oxidation reaction of the unburned gas, endotherm due to the NOx reduction reaction, and the like, and these reaction rates strongly depend on the catalyst temperature. The catalytic reaction generation heat amount calculation unit 1703 can accurately calculate the generated heat amount in the catalyst 21 in consideration of these. For example, the upstream exhaust gas concentration may be calculated by the catalyst statistical model calculation unit 1503 to which the detection value of the front air-fuel ratio sensor is input.

The catalyst heat balance calculation unit 1704 calculates a balance of each heat transfer amount calculated by the exhaust gas/catalyst heat transfer amount calculation unit 1701 and the catalyst/atmospheric heat transfer amount calculation unit 1702 and a heat amount calculated by the catalytic reaction generation heat amount calculation unit 1703.

The catalyst temperature calculation unit 1705 calculates the temporal change of the catalyst temperature in consideration of catalyst specifications (volume, aperture ratio, surface area, mass, specific heat, and the like) based on the calculation result of the catalyst heat balance by the catalyst heat balance calculation unit 1704. The calculation result of the catalyst temperature is input to the exhaust gas/catalyst heat transfer amount calculation unit 1701 and the catalyst/atmospheric heat transfer amount calculation unit 1702. With such a configuration, even in a system in which the starting and stopping of the internal combustion engine 1 are repeated, the catalyst temperature important for estimating the catalyst state can be calculated with high accuracy.

[Statistical Model]

Next, the nonlinear transient statistical model adopted in the catalyst statistical model 1503M and the rear oxygen sensor statistical model 1504M in the catalyst statistical model calculation unit 1503 and the rear oxygen sensor statistical model calculation unit 1504 shown in FIG. 15 will be described with reference to FIG. 18. Hereinafter, the catalyst statistical model 1503M and the rear oxygen sensor statistical model 1504M may be abbreviated as "statistical models".

Figure 18:
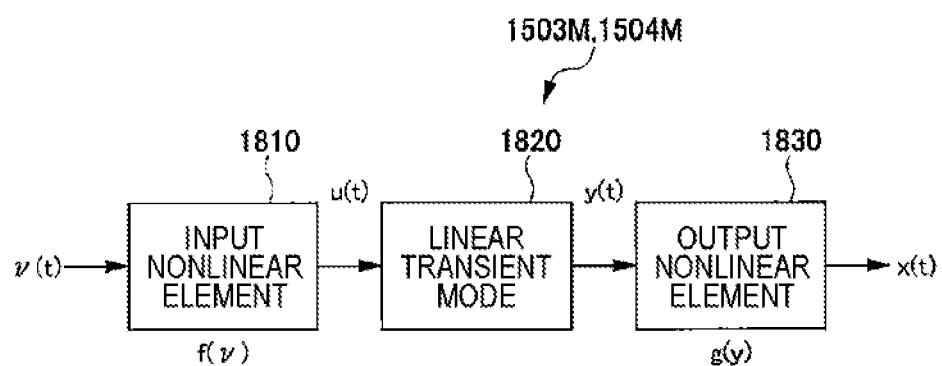
FIG. 18 is a block diagram showing a configuration of a nonlinear transient statistical model adopted in the statistical model in the catalyst temperature calculation unit and the oxygen storage ratio calculation unit shown in FIG. 15.

FIG. 18 is a block diagram showing a configuration example of a nonlinear transient statistical model adopted in the statistical models 1503M and 1504M. Since the basic construction methods of the statistical models 1503M and 1504M are the same, the statistical model 1503M will be described here.

The statistical model 1503M, which is a nonlinear transient statistical model, includes three elements, and includes an input nonlinear element 1810, a linear transient model 1820, and an output nonlinear element 1830. An autoregressive with eXogenous model (ARX model) generally used in control can be applied to the linear transient model 1820. The order of the ARX model can be selected by a balance between accuracy and operation load. In the system of the present embodiment, deterioration of the catalyst 21 and the oxygen sensor 22 is treated as a time-varying system, and a method of on-board approximation by sequential system identification of the linear transient model 1820 is adopted.

A tuning parameter (model constant) is set to the linear transient model 1820, and the tuning parameter is updated online. Therefore, the latest system state (dynamic characteristic) can always be reflected in the statistical model 1503M.

As an example, when a function representing a characteristic of the input nonlinear element 1810 is $f(\upsilon)$, an input is $\upsilon(t)$, and an output is $u(t)$, it can be expressed as $u(t)=f(\upsilon)$. In addition, when a function representing a characteristic of the output nonlinear element 1830 is $g(y)$, an input from the linear transient model 1820 is $y(t)$, and an output is $x(t)$, it can be expressed as $x(t)=g(y)$.

The model formula (discretization) of the linear transient model 1820 is expressed by Formula (10) as an example. The left side of Formula (10) represents the output side, and the right side represents the input side. [k] corresponds to the future, [k−1] corresponds to the present (strictly, the past one step before), and [k−2] corresponds to the past.

[Mathematical Formula 1]

$$y(k)+a_1 \cdot y(k-1)+a_2 \cdot y(k-2)=b_1 \cdot u(k-1)+b_2 \cdot u(k-2) \quad (10)$$

Here, Formula (10) representing the linear transient model 1820 can be transformed as Formula (11). θ on the right side in Formula (11) is a transposed matrix of a matrix of 1 row and 4 columns represented by Formula (12), and φ is a matrix of 1 row and 4 columns represented by Formula (13). −a1, −a2, b1, and b2 in Formula (12) are arbitrary coefficients (examples of tuning parameters).

[Mathematical Formula 2]

$$y(k)=\theta^T \cdot \phi(k) \quad (11)$$

$$\theta=[-a_1,-a2,b_1,b2]^T \quad (12)$$

$$\phi=[y(k-1),y(k-2),u(k-1),u(k-2)] \quad (13)$$

Since the statistical models 1503M and 1504M include such components, the catalytic reaction characteristics and the temporal change thereof can be appropriately considered. In addition, the ARX model can be organized by a state equation and applied to the Kalman filter. According to the Kalman filter, the state variable defined by the state equation can be appropriately corrected in consideration of the difference between the model output and the sensor detection value. As a result, state feedback control based on an actual sensor detection value can be configured, and highly accurate control can be realized.

[Catalyst Statistical Model, Rear Oxygen Sensor Statistical Model]

Next, the catalyst statistical model 1503M and the rear oxygen sensor statistical model 1504M will be described.

The catalyst statistical model 1503M and the rear oxygen sensor statistical model 1504M both have hysteresis, and adopt a hysteresis model. Furthermore, the rear oxygen sensor statistical model 1504M includes a conversion function in consideration of the nonlinearity of the rear oxygen sensor in the input nonlinear element. With such a configuration, the catalyst downstream equivalence ratio and the rear oxygen sensor output can be accurately calculated.

(Hysteresis Model of Catalyst Statistical Model)

In the catalyst statistical model 1503M, when a term considering the hysteresis characteristics of the three-way catalyst is set to the function $f(\upsilon)$ of the input nonlinear element 1810, as an example, the model formula of the output y (rear equivalence ratio) of the linear transient model 1820 can be expressed by Formula (14). u1 and u2 are tuning parameters (constants).

[Mathematical Formula 3]

$$y(k)=b_1 \cdot |u(k-1)| \cdot y(k-1)+b_2 \cdot u(k-1) \quad (14)$$

u(k): Front air-fuel ratio×Catalyst temperature×Exhaust gas flow rate y(k): Rear equivalence ratio (Hysteresis Model of Rear Oxygen Sensor Statistical Model)

In addition, in the rear oxygen sensor statistical model 1504M, when a term considering the hysteresis characteristic of the rear oxygen sensor is set to the function $f(\upsilon)$ of the input nonlinear element 1810, as an example, the model formula of the output y of the linear transient model 1820 can be expressed by Formula (15). As a result, the rear equivalence ratio of the input is converted based on the rear oxygen sensor characteristics. In addition, the output (estimated value) of the rear oxygen sensor is obtained. u1 to u3 are tuning parameters (constants). The tuning parameters of the rear oxygen sensor statistical model 1504M can be set independently of the catalyst statistical model 1503M.

[Mathematical Formula 4]

$$y(k)=b_1 \cdot |u(k-1)| \cdot y(k-1)+b_2 \cdot u(k-1)+b_3 \cdot u(k-1) \quad (15)$$

u(k): Rear equivalence ratio→Sensor characteristics conversion y(k): Rear oxygen sensor output As described above, in the present embodiment, the hysteresis term reflecting the characteristic in which the response speed of the output is different between when the input increases and when the input decreases is set in the input element (input nonlinear element 1810) of the catalyst statistical model 1503M. The same applies to the rear oxygen sensor statistical model 1504M. With such a configuration, it is possible to approximate the hysteresis of the catalyst 21 and the exhaust gas sensor (oxygen sensor 22) downstream of the catalyst 21 in each of the catalyst statistical model 1503M and the rear oxygen sensor statistical model 1504M.

As described above, the hysteresis term of the present embodiment includes the term ($b_1 \cdot |u(k-1)| \cdot y(k-1)+b_2 \cdot u(k-1)$) defined by the first input parameter (u) that takes both positive and negative values and the second input parameter ($|u| \cdot y$) defined by the product of the output parameter(y) that takes a positive value and the absolute value (|u|) of the first input parameter. In this case, the hysteresis of the catalyst 21 and the oxygen sensor 22 can be accurately reflected in the respective input elements of the catalyst statistical model 1503M and the rear oxygen sensor statistical model 1504M.

In addition, a function representing a characteristic of the output nonlinear element 1830 is denoted by g(y), an input from the linear transient model 1820 is denoted by y(t), and an output is denoted by a rear oxygen sensor detection value x(t). When a sigmoid function for approximating the rear oxygen sensor static characteristic (see FIG. 5) is set to the function g(y) of the output nonlinear element 1830, a model formula of the output x is expressed by Formula (16) as an example.

[Mathematical Formula 5]

$$X = g(y) = \frac{1}{1 + \exp(-y)} \quad (16)$$

As described above, the sigmoid function can be set to the output element (the output nonlinear element 1830) of the rear oxygen sensor statistical model 1504M of the present embodiment. With this configuration, the static characteristics of the exhaust gas sensor (oxygen sensor 22) downstream of the catalyst 21 can be approximated.

Note that the sigmoid function used in the output nonlinear element 1830 can be replaced with table calculation in order to reduce the calculation load. In addition, the function g(y) of the output nonlinear element 1830 is not limited to the sigmoid function as long as the output is large when the rear equivalence ratio is in the rich state and the output is small when the equivalence ratio is in the lean state.

[Rear Equivalence Ratio Calculation Unit]

Figure 19:
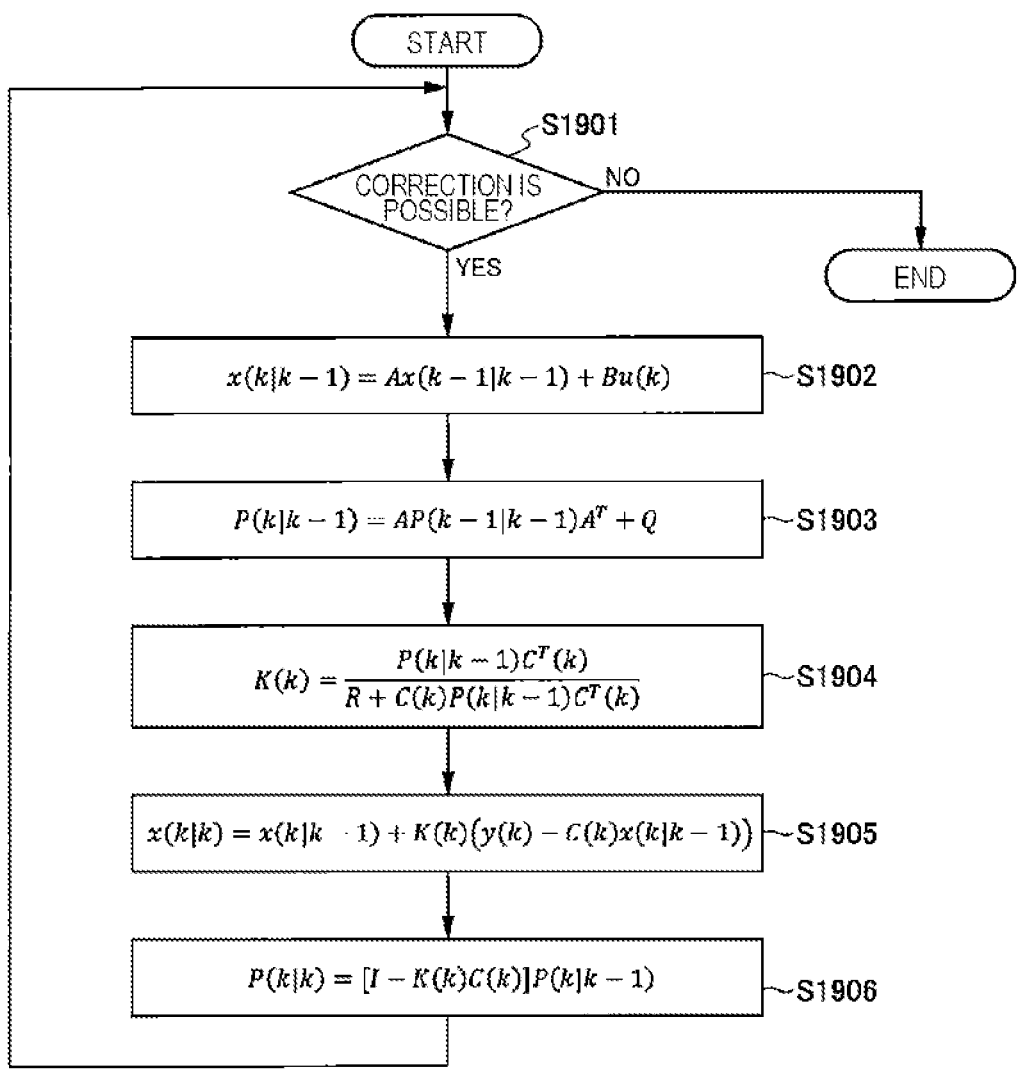
FIG. 19 is a flowchart showing an example of a Kalman filter algorithm used in the rear equivalence ratio calculation unit shown in FIG. 15.
Figure 20:
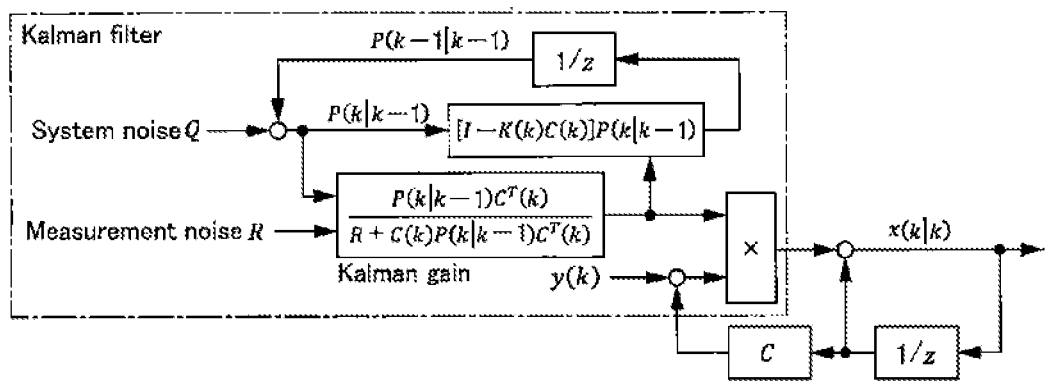
FIG. 20 is a block diagram showing an internal configuration example of a Kalman filter.

Next, a Kalman filter algorithm used in the rear equivalence ratio calculation unit 1505 will be described with reference to FIGS. 19 and 20. FIG. 19 is a flowchart showing an example of the Kalman filter algorithm used in the rear equivalence ratio calculation unit 1505 shown in FIG. 15. FIG. 20 is a block diagram showing an internal configuration example of the Kalman filter.

The rear equivalence ratio calculation unit 1505 determines whether or not the rear equivalence ratio can be corrected by the Kalman filter based on the operating state of the internal combustion engine 1 (S1901). When determining that the correction is impossible (NO in S1901), the rear equivalence ratio calculation unit 1505 ends the processing of this flowchart.

On the other hand, when determining that the correction is possible (YES in S1901), the rear equivalence ratio calculation unit 1505 updates the state variable of the state equation of the rear oxygen sensor statistical model 1504M based on the processing steps of steps S1902 to S1906 and the rear oxygen sensor detection value. At this time, the rear equivalence ratio calculation unit 1505 considers a system error existing in the target system and a sensor error existing in the rear oxygen sensor detection value with respect to the correction amount of the state variable. In this way, it is possible to perform robust correction with respect to the error.

Note that the system of the present embodiment employs a linear Kalman filter algorithm, but the present invention is not limited thereto. That is, even when an extended Kalman filter known as a nonlinear Kalman filter, an ensemble Kalman filter, or the like is applied, a similar effect is obtained.

The Kalman filter will be described in more detail. The Kalman filter describes a control target by a state equation, and defines sensor measurement information in an output variable of the state equation. Then, an internal state variable that cannot be directly measured is estimated on the basis of the sensor measurement information defined in the output variable.

The Kalman filter, which is one of the components of the catalytic oxygen storage control, will be described with respect to an algorithm and an application method to this control. The Kalman filter is based on a state equation including the system noise Q and the observation noise R defined by Formulas (17) and (18).

[Mathematical Formula 6]

$$x(k+1) = Ax(k) + Bu(k) + Q \quad (17)$$

[Mathematical Formula 7]

$$y(k) = Cx(k) + R \quad (18)$$

The Kalman filter is divided into a prediction step and a filtering step. In the prediction step, the internal state variable vector x and the covariance matrix P are updated by Formulas (19) and (20) based on the input variable and the system noise Q (S1902, S1903).

[Mathematical Formula 8]

$$x(k|k-1) = Ax(k-1|k-1) + Bu(k) \quad (19)$$

[Mathematical Formula 9]

$$P(k|k-1) = AP(k-1|k-1)A^T + Q \quad (20)$$

Next, in the filtering step, the Kalman gain K defined by the updated covariance matrix P and the observation noise R is calculated by Formula (21) (S1904).

[Mathematical Formula 10]

$$K(k) = \frac{P(k|k-1)C^T(k)}{R + C(k)P(k|k-1)C^T(k)} \quad (21)$$

Using the Kalman gain K and the observation data (rear oxygen sensor detection value), the internal state variable vector x and the covariance matrix P are updated again by Formulas (22) and (23) (S1905, S1906). In this way, the internal state variable vector x and the covariance matrix P are corrected by the actual observation data (rear oxygen sensor detection value).

[Mathematical Formula 11]

$$x(k|k) = x(k-1|k-1) + K(k)(y(k) - C(k) \cdot x(k|k-1)) \quad (22)$$

[Mathematical Formula 12]

$$P(k|k) = [1 - K(k) \cdot C(k)]P(k|k-1) \quad (23)$$

From the above calculation, the behavior of the internal state variable x(k|k) that is difficult to directly measure by the rear oxygen sensor can be estimated based on the measurable output information. In the present embodiment, the catalyst downstream equivalence ratio corresponding to the three-way catalytic oxygen storage ratio was estimated by the Kalman filter based on the detection value of the rear oxygen sensor. When the rear oxygen sensor statistical model 1504M is described by a state equation, Formula (24) is obtained. Formula (24) is the same as Formula (15).

[Mathematical Formula 13]

$$y(k)=b_1 \cdot |u(k-1)| \cdot y(k-1) + b_2 \cdot u(k-1) + b_3 \cdot u(k-1) \quad (24)$$

Furthermore, as described above, in the Kalman filter, the state equation including the system noise Q and the observation noise R is expressed by Formulas (25) and (26). The coefficients A, B, and C are expressed by Formula (27).

[Mathematical Formula 14]

$$X(k+1)=AX(k)+BU(k)+Q \quad (25)$$

[Mathematical Formula 15]

$$Y(k)=CX(k)+R \quad (26)$$

[Mathematical Formula 16]

$$A = \begin{bmatrix} b_1|u(k-1)| & b_3 \\ 0 & 0 \end{bmatrix} \quad X = \begin{bmatrix} y(k-1) \\ u(k-2) \end{bmatrix}$$
$$B = \begin{bmatrix} b_2 & 0 \\ 1 & 0 \end{bmatrix} \quad U = \begin{bmatrix} u(k-1) \\ 0 \end{bmatrix}$$
$$C = [1 \ 0] \quad Y = y(k) \quad (27)$$

The matrix and the vector defined by Formula (27) are applied to the Kalman filter model. The catalyst downstream equivalence ratio output from the Kalman filter (rear equivalence ratio calculation unit 1505) is used for teacher data for state feedback control and deterioration identification (deterioration learning).

[System Identification Algorithm]

Figure 21:
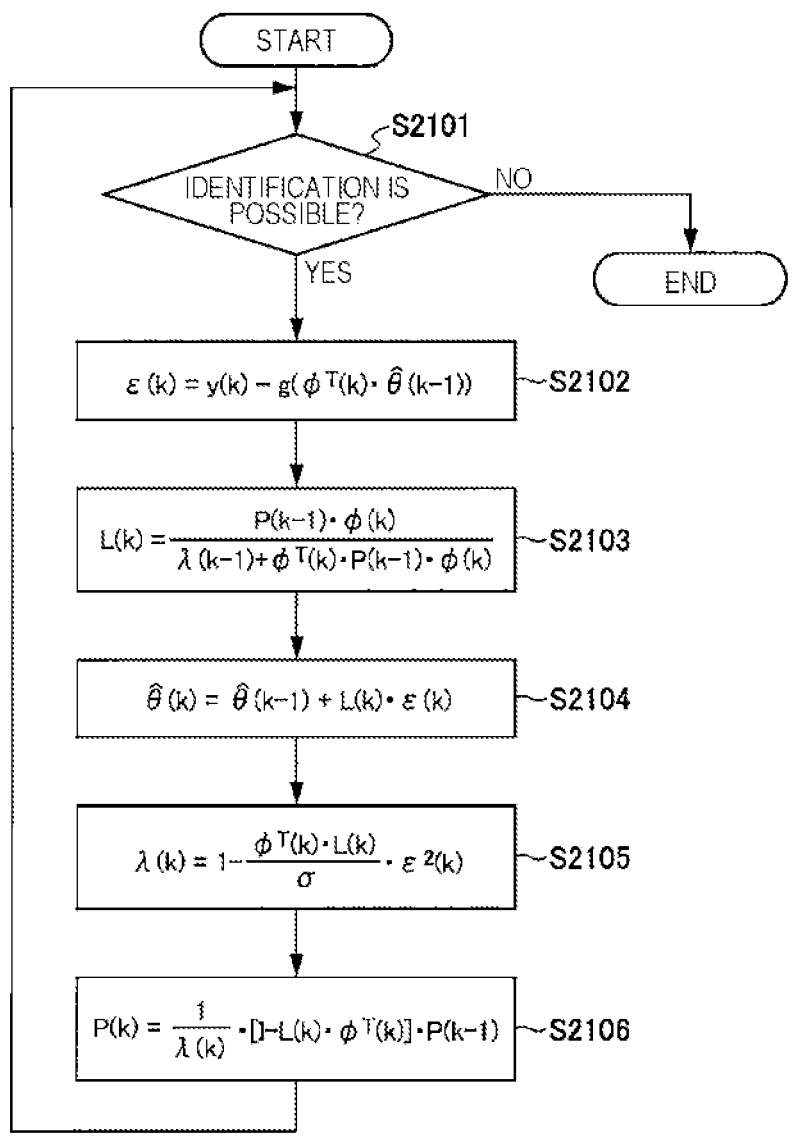
FIG. 21 is a flowchart showing an example of a system identification algorithm in the system identification unit shown in FIG. 15.

FIG. 21 is a flowchart showing an example of a system identification algorithm in the system identification unit 1507 shown in FIG. 15. In the present embodiment, a sequential least squares approximation algorithm with a variable forgetting element is adopted for sequential identification of tuning parameters of the catalyst statistical model 1503M. The forgetting element is to exponentially forget the past history according to the age. By adopting the forgetting element, the influence of the latest state of the engine system can be appropriately considered for the tuning parameter.

First, the system identification unit 1507 determines whether the catalyst statistical model 1503M is in a state where the tuning parameter can be identified (S2101). The control unit 31 of the ECU 28 determines whether or not the identification is possible based on the operating state of the internal combustion engine 1. The system identification unit 1507 refers to an identification permission flag that is set when identification is possible, and determines that the identification processing is permitted, for example, when the identification permission flag is "1". Here, whether or not it is the timing for identification may be used as the determination condition. If the system identification unit 1507 determines that identification is impossible (NO in S2101), the processing of this flowchart ends.

Next, when determining that identification is possible (YES in S2101), the system identification unit 1507 calculates Formulas (28) to (32) by the system identification algorithm (S2102 to S2106).

[Mathematical Formula 17]

$$\varepsilon(k)=y(k)-g(\varphi^T(k) \cdot \hat{\theta}(k-1)) \quad (28)$$

[Mathematical Formula 18]

$$L(k) = \frac{P(k-1) \cdot \phi(k)}{\lambda(k-1) + \phi^T(k) \cdot P(k-1) \cdot \phi(k)} \quad (29)$$

[Mathematical Formula 19]

$$\hat{\theta}(k)=\hat{\theta}(k-1)+L(k) \cdot \varepsilon(k) \quad (30)$$

[Mathematical Formula 20]

$$\lambda(k) = 1 - \frac{\phi^T(k) \cdot L(k)}{\sigma} \cdot \varepsilon^2(k) \quad (31)$$

[Mathematical Formula 21]

$$P(k) = \frac{1}{\lambda(k)} \cdot (I - L(k) \cdot \phi^T(k)) \cdot P(k-1) \quad (32)$$

ε(k) in Formula (28) in step S2102 represents a difference between the current measured value of the oxygen sensor 22 and the estimated value (predicted value) of the rear oxygen sensor. Formulas (29) to (32) in steps S2103 to S2106 are calculated based on the value of ε(k). θ^(k) (^ is above θ in the drawing) of Formula (30) in step S2104 is a parameter vector of the catalyst statistical model 1503M, and means an instantaneous value that changes sequentially. λ(k) in Formula (31) in step S2105 represents a variable forgetting coefficient. Furthermore, cy in Formula (31) is a parameter for adjusting the degree of variation of the variable forgetting coefficient A(k). P(k) in Formula (32) in step S2106 represents a covariance matrix defined by the regression vector.

These formulas, tuning parameters, and the like in the system identification are an example. Furthermore, in Formulas (28) to (32), unlike Formula (11), a matrix of φ is transposed instead of θ, but any matrix may be used.

After the process of step S2106, the process proceeds to the determination process of step S2101. Then, the system identification unit 1507 updates the tuning parameter of the catalyst statistical model 1503M based on the calculation result.

As described above, the statistical model learning unit (system identification unit 1507) of the present embodiment is obtained by applying the sequential least squares algorithm. Since the sequential least squares algorithm is a method (sequential calculation formula) of correcting the immediately preceding estimated value each time new data is obtained, it is possible to perform online estimation and real-time estimation of the rear oxygen sensor. In particular, the sequential least squares approximation algorithm with a variable oblivion element sets an evaluation function that is more important for data closer to the identification time, and thus has high applicability to a system in which a tuning parameter changes as in the present embodiment.

Note that, although the sequential least squares algorithm is adopted as the parameter identification algorithm of the present embodiment, the present invention is not limited thereto. That is, even when other optimization methods such as a gradient method and a genetic algorithm are applied as the parameter identification algorithm, a similar or close effect is obtained.

[Air-Fuel Ratio Correction Amount Calculation]

Figure 22:
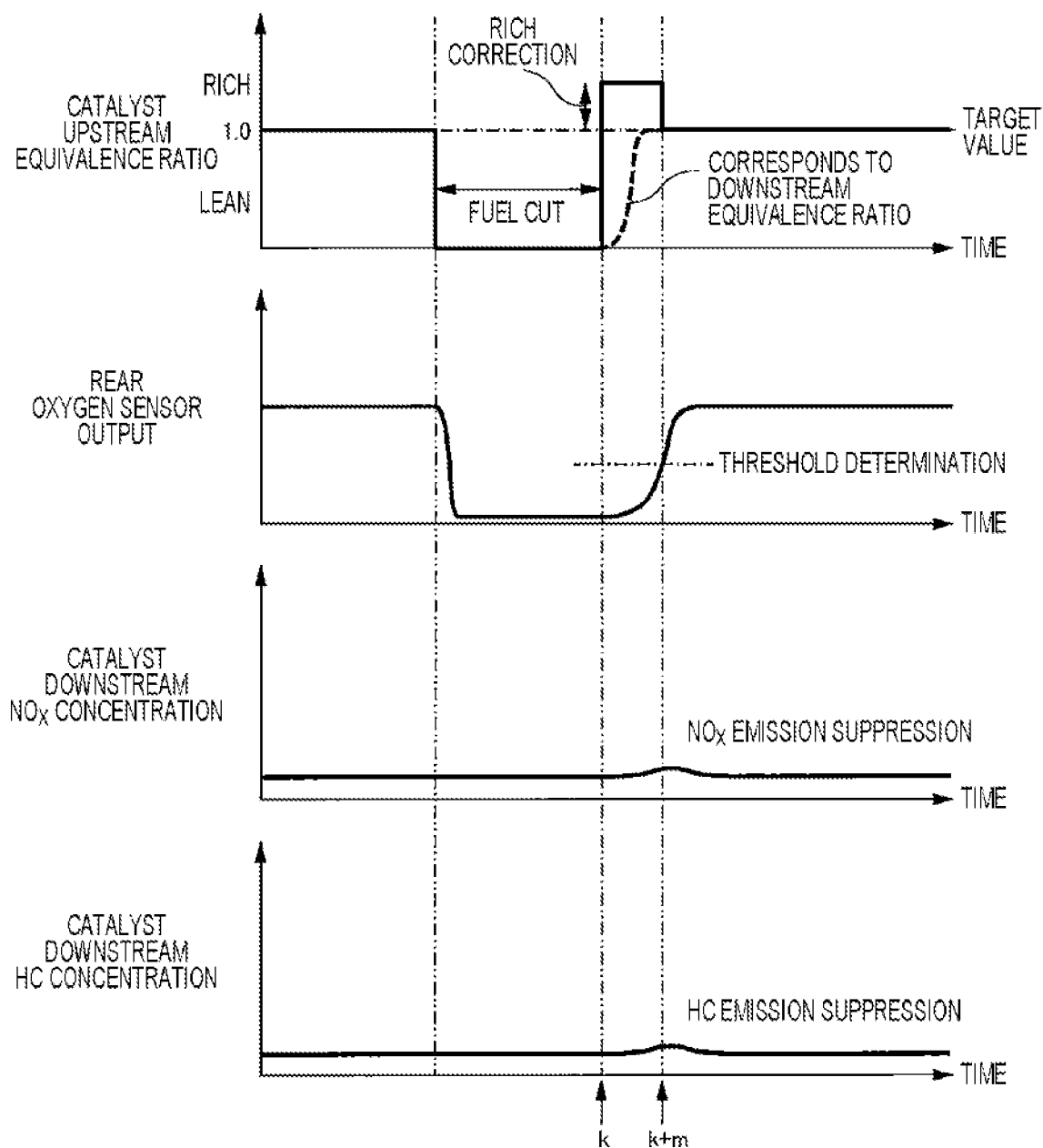
FIG. 22 is a diagram showing a calculation result and an effect of the air-fuel ratio correction amount in the air-fuel ratio correction amount calculation unit shown in FIG. 15.

FIG. 22 shows a calculation result and an effect of the air-fuel ratio correction amount in the air-fuel ratio correction amount calculation unit 1506 shown in FIG. 15. In each graph of FIG. 22, the horizontal axis represents time, and the vertical axis represents the catalyst upstream equivalence ratio (first stage graph), the rear oxygen sensor output (second stage graph), the catalyst downstream NOx concentration (third stage graph), and the catalyst downstream HC concentration (fourth stage graph). In each graph, the solid line indicates the behavior during the rich correction, and the broken line indicates the behavior of the downstream equivalence ratio. Here, a calculation method and an effect of the air-fuel ratio correction amount calculation unit 1506 will be described using the air-fuel ratio correction after the fuel cut as an example.

The air-fuel ratio correction amount calculation unit 1506 corrects the rear equivalence ratio calculated by the catalyst statistical model calculation unit 1503 based on the Kalman filter. As parameters of the catalyst statistical model 1503M used at this time, the latest dynamic characteristics of the catalyst 21 are considered by system identification. As a result, the air-fuel ratio correction amount calculation unit 1506 starts the rich correction at the k-step after the fuel cut, and can control the completion timing (correction period) of the rich correction on the basis of the rear oxygen sensor output estimated by the rear oxygen sensor statistical model calculation unit 1504. That is, the air-fuel ratio correction amount calculation unit 1506 can stop the rich correction (air-fuel ratio control) at the timing ((k+m) step) when the actual detection value of the rear oxygen sensor crosses the threshold Th set in advance.

By adopting such a method, it is possible to appropriately avoid the problem of excessive rich correction in the method of stopping the air-fuel ratio correction after the rear oxygen sensor output actually changes, to suppress NOx emission, and to prevent excessive rich correction. In this way, it is possible to suppress HC emission downstream of the catalyst and to prevent emission deterioration.

Furthermore, since the completion timing of the rich correction is optimized on-board in accordance with the deterioration state of the catalyst 21 and the rear oxygen sensor, adaptation work for each deteriorated catalyst is unnecessary, and adaptation development man-hours can be greatly reduced. Furthermore, the catalyst purification efficiency can be maintained at a high level by appropriate air-fuel ratio control, which also contributes to a reduction in the amount of catalyst used, that is, a reduction in the cost of the post-processing system.

[Calculation of Air-Fuel Ratio Correction Amount and Control of Fuel Injection Amount]

Figure 23:
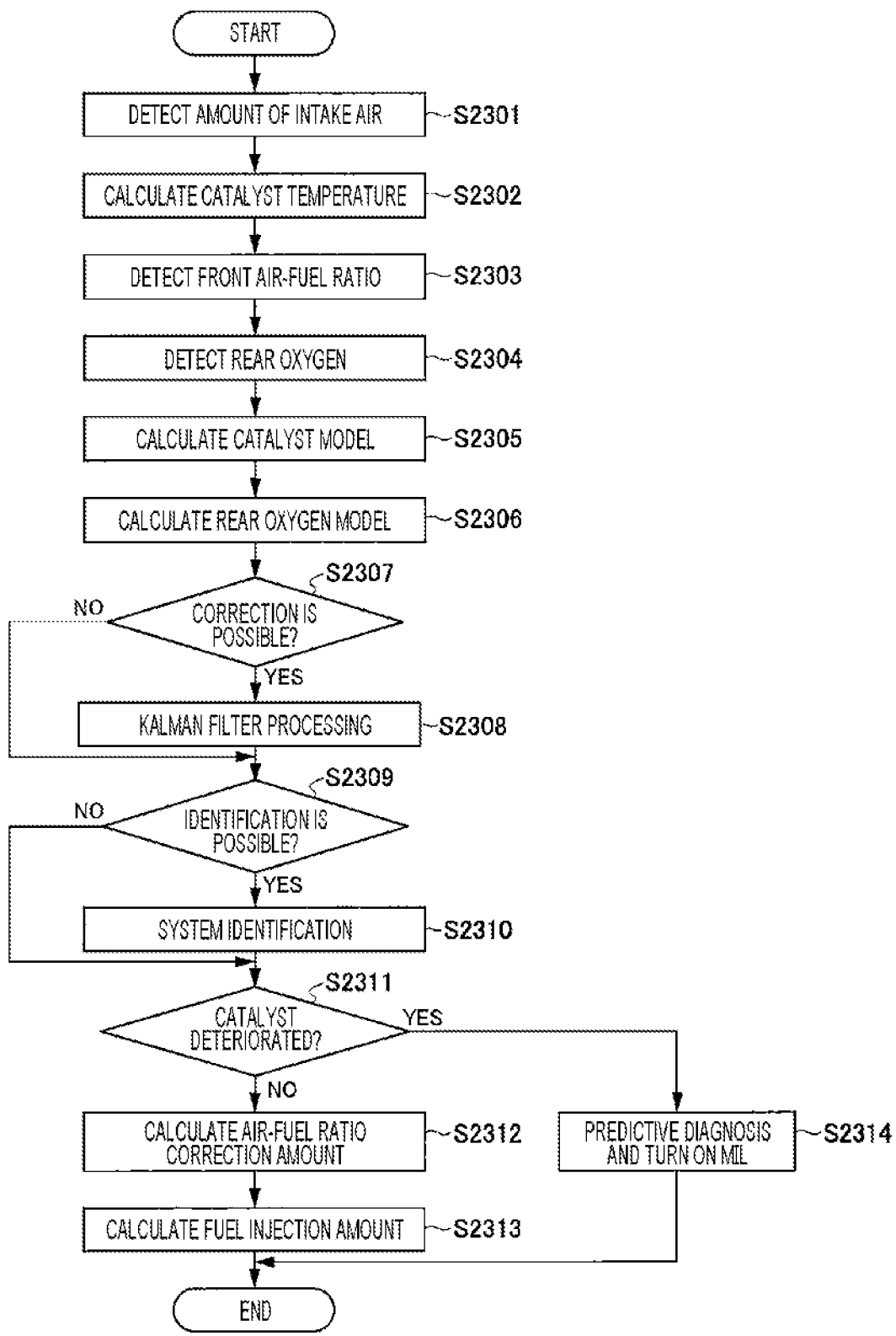
FIG. 23 is a flowchart showing an example of a procedure for calculating an air-fuel ratio correction amount based on a flow rate sensor detection value and exhaust gas sensor detection values upstream/downstream of a catalyst and executing fuel injection amount control.

FIG. 23 is a flowchart showing an example of a procedure for calculating the air-fuel ratio correction amount based on the detection value of the flow rate sensor 2 and the detection values of the exhaust gas sensors (air-fuel ratio sensor 20, oxygen sensor 22) on the upstream and downstream sides of the catalyst and executing the fuel injection amount control.

First, the control unit 31 of the ECU 28 detects the amount of intake air taken into the internal combustion engine 1 by the flow rate sensor 2 (S2301). The catalyst boundary condition calculation unit 1501 calculates the exhaust gas flow rate from the intake air amount and the fuel injection amount.

Next, the catalyst temperature calculation unit 1502 calculates the temperature of the catalyst 21 based on the current operating state of the internal combustion engine 1 (S2302).

Next, the control unit 31 detects the air-fuel ratio upstream of the catalyst by the air-fuel ratio sensor 20 assembled upstream of the catalyst 21 (S2303). In addition, the control unit 31 detects the oxygen presence/absence state downstream of the catalyst by the oxygen sensor 22 assembled downstream of the catalyst 21 (S2304).

Next, the catalyst statistical model calculation unit 1503 inputs information of the catalyst upstream exhaust gas air-fuel ratio, the catalyst temperature, and the exhaust gas flow rate to the catalyst statistical model 1503M, and calculates a rear equivalence ratio which is information corresponding to the oxygen storage ratio of the catalyst 21 (S2305).

Next, the rear oxygen sensor statistical model calculation unit 1504 inputs the rear equivalence ratio, which is information corresponding to the oxygen storage ratio, to the rear oxygen sensor statistical model 1504M and calculates an estimated value of the rear oxygen sensor output (S2306).

Next, the rear equivalence ratio calculation unit 1505 determines whether or not correction by the Kalman filter can be performed on the basis of the operating state of the internal combustion engine 1 (S2307). The control unit 31 sets the correction permission flag to "1" (ON) when determining that correction is possible (YES in S2307), and sets the correction permission flag to "0" (OFF) when determining that correction is impossible (NO in S2307).

An exhaust gas sensor operating state, a catalyst temperature range, an execution state of diagnosis processing, a diagnosis result, and the like are set as determination criteria of correctability. As an example, the Kalman filter correction process is stopped immediately after the engine is started and before the rear oxygen sensor is activated. When the temperature of the catalyst 21 is outside the predetermined range, the catalyst 21 does not normally function, so that accurate Kalman filter correction cannot be executed. Therefore, the rear equivalence ratio calculation unit 1505 stops the Kalman filter correction processing. Furthermore, the correction process is also stopped at the time of diagnosis of the catalyst 21 or the rear oxygen sensor. By having such a function of stopping the Kalman filter correction processing, the correction processing by the Kalman filter can be performed with high accuracy.

As described above, the downstream equivalence ratio correction unit (rear equivalence ratio calculation unit 1505) of the present embodiment is configured to determine whether or not to correct the catalyst downstream exhaust gas equivalence ratio (rear equivalence ratio) on the basis of any one of the states of the operating state of the air-fuel ratio sensor (air-fuel ratio sensor 20) on the catalyst upstream side and the oxygen sensor (oxygen sensor 22) on the catalyst downstream side, the catalyst temperature state, the catalyst deterioration diagnosis state, and the diagnosis states of the air-fuel ratio sensor and the oxygen sensor, and stop the correction of the catalyst downstream exhaust gas equivalence ratio when it is determined that the correction is impossible.

Next, when it is determined that the correction is possible (YES in S2307), the rear equivalence ratio calculation unit 1505 corrects the rear equivalence ratio output by the rear oxygen sensor statistical model calculation unit 1504 using the Kalman filter based on the rear oxygen sensor detection value (S2308).

Next, in a case where it is determined in step S2307 that correction is impossible (NO in S2307), or after the process of step S2308, the control unit 31 (or the system identification unit 1507) determines whether or not parameter update by system identification can be performed on the basis of the operating state of the internal combustion engine 1 (S2309). The control unit 31 sets the identification permission flag to "1" (ON) in a case where it is determined that identification is possible (YES in S2309), and sets the identification permission flag to "0" (OFF) in a case where it is determined that identification is impossible (NO in S2309).

An exhaust gas sensor operating state, a catalyst temperature range, an execution state of diagnosis processing, a diagnosis result, and the like are set as determination criteria of identification propriety. As an example, the system identification processing is stopped immediately after the engine is started and before the exhaust gas sensor is started. In addition, when the temperature of the catalyst 21 is outside the predetermined range, the catalyst 21 does not normally function, and thus accurate system identification cannot be executed. Therefore, the control unit 31 (or the system identification unit 1507) stops the identification processing. Further, the identification processing is stopped also at the time of diagnosis of the catalyst 21 or the exhaust gas sensor related to the post-processing system. By having such a system identification stop function, the system identification by the sequential least squares method can be performed with high accuracy.

As described above, the statistical model learning unit (system identification unit 1507) of the present embodiment is configured to determine whether or not the statistical model (catalyst statistical model 1503M) can be learned on the basis of any one of the states of the operating state of the air-fuel ratio sensor (air-fuel ratio sensor 20) on the upstream side of the catalyst and the rear oxygen sensor (oxygen sensor 22) on the downstream side of the catalyst, the catalyst temperature state, the catalyst deterioration diagnosis state, and the diagnosis states of the air-fuel ratio sensor and the rear oxygen sensor, and stop learning of the statistical model when it is determined that learning is impossible. As a result, it is possible to efficiently perform learning while avoiding a period in which the learning effect does not increase.

In a case where it is determined that identification is possible (YES in S2309), the system identification unit 1507 sequentially calculates tuning parameters of the catalyst statistical model 1503M on the basis of the sequential least squares approximation algorithm with the variable forgetting element to perform system identification (S2310).

For example, the system identification unit 1507 determines whether system identification is completed based on the update state of the tuning parameter (the temporal change amount of the tuning parameter is equal to or less than a predetermined value). In a case where the identification is not completed, the tuning parameter changes as the input and the output change. Therefore, even if the input and the output fluctuate, if the fluctuation of the tuning parameter is small, it can be determined that the identification is completed. Next, in a case where the system identification unit 1507 determines that the system identification is not completed, the system identification processing is continued. Then, the system identification unit 1507 updates the tuning parameter of the catalyst statistical model 1503M when the system identification is completed.

In the present embodiment, as an example, the system identification unit 1507 (statistical model learning unit) is configured to learn the tuning parameter of the catalyst statistical model 1503M during the fuel cut operation according to the determination result of the control unit 31. At the time of fuel cut, the oxygen concentration in the exhaust gas increases, and the state of input and output fluctuates, so that highly accurate learning can be performed. Therefore, the rich correction (air-fuel ratio control) after the fuel cut can be more appropriately performed.

Next, when it is determined in step 2309 that identification is impossible (NO in S2309), or after the processing in step S2310, a deterioration state of the catalyst 21 is determined based on the identified tuning parameter (S2311). The tuning parameters include information on the dynamic characteristics of the catalyst 21 and the exhaust gas sensor, and it is possible to determine whether or not the deterioration state of the catalyst 21 assumed in the catalyst statistical model 1503M is appropriate by capturing a change in the dynamic characteristics.

When it is determined that the progress of the deterioration is within the range (allowable range) of the normal state (NO (normal) in S2311), the air-fuel ratio correction amount calculation unit 1506 calculates the state feedback correction amount of the air-fuel ratio based on the difference between the rear equivalence ratio (air-fuel ratio) calculated by the rear equivalence ratio calculation unit 1505 and the current air-fuel ratio target value (S2312).

Next, the control unit 31 calculates the fuel injection amount by the fuel injection valve 15 based on the intake air amount after adding the state feedback correction amount (air-fuel ratio correction amount) obtained by the air-fuel ratio correction amount calculation unit 1506 to the current air-fuel ratio control amount (S2313).

On the other hand, when it is determined that the progress of deterioration is outside the range (allowable range) of the normal state (YES in S2311 (deterioration)), the control unit 31 outputs the predictive diagnosis result and the on-board diagnosis result (S2314). For example, when there is an abnormality or a failure as a result of the predictive diagnosis, the corresponding warning display lamp 29 (MIL) is turned on. After the processing of step S2313 or S2314, the processing of this flowchart ends.

When the catalyst statistical model 1503M is not updated, the process related to system identification in steps S2309 to S2310 can be omitted. However, as described in the description of FIG. 21, by controlling the air-fuel ratio using the catalyst statistical model 1503M updated to the latest state based on the actual measurement value of the exhaust gas sensor (oxygen sensor 22) downstream of the catalyst, the oxygen storage state in the catalyst 21 can be always maintained in a suitable state. When the deterioration of the catalyst 21 is not considered, the deterioration determination process of the catalyst 21 in step S2311 can be omitted.

As described above, the internal combustion engine control device (ECU 28) of the present embodiment is an internal combustion engine control device including the exhaust purification catalyst (catalyst 21) provided in the exhaust pipe of the internal combustion engine (internal combustion engine 1), the air-fuel ratio sensor (air-fuel ratio sensor 20) disposed upstream of the exhaust purification catalyst, and the oxygen sensor (oxygen sensor 22) disposed downstream of the exhaust purification catalyst.

This internal combustion engine control device includes: a downstream equivalence ratio calculation unit (catalyst statistical model calculation unit 1503) that calculates a catalyst downstream exhaust gas equivalence ratio using a catalyst statistical model (catalyst statistical model 1503M) that receives at least a detection value of an air-fuel ratio sensor as an input and outputs a catalyst downstream exhaust gas equivalence ratio (rear equivalence ratio); an oxygen output calculation unit (rear oxygen sensor statistical model calculation unit 1504) that calculates an output value of an oxygen sensor using an oxygen sensor statistical model (rear oxygen sensor statistical model 1504M) that receives the catalyst downstream exhaust gas equivalence ratio as an input and outputs an output value of the oxygen sensor; a downstream equivalence ratio correction unit (rear equivalence ratio calculation unit 1505) that corrects the catalyst downstream exhaust gas equivalence ratio calculated by the downstream equivalence ratio calculation unit based on a calculation result of the oxygen output calculation unit and the detection value of the oxygen sensor; and an air-fuel ratio control unit (air-fuel ratio correction amount calculation unit 1506, control unit 31) that controls the air-fuel ratio of the air-fuel mixture of the internal combustion engine based on the corrected catalyst downstream exhaust gas equivalence ratio and air-fuel ratio target value.

In the present embodiment configured as described above, the catalyst downstream exhaust gas equivalence ratio (rear equivalence ratio) corresponding to the catalytic oxygen storage ratio is periodically corrected based on the detection value (actual measurement value) of the oxygen sensor on the catalyst downstream side, and the air-fuel ratio of the internal combustion engine can be feedback-controlled based on the corrected rear equivalence ratio. Therefore, the oxygen storage state in the exhaust purification catalyst (for example, three-way catalyst) can be maintained in a suitable state. Therefore, in the present embodiment, the catalyst purification efficiency can be kept at a high level, and deterioration of emission performance can be prevented. In addition, by using the oxygen sensor downstream of the catalyst, the catalyst downstream exhaust gas equivalence ratio (exhaust gas concentration) can be made highly accurate at low cost.

In addition, by correcting the catalyst downstream exhaust gas equivalence ratio (rear equivalence ratio) output by the catalyst statistical model 1503M, air-fuel ratio control synchronized with the behavior of the oxygen sensor on the catalyst downstream becomes possible.

Furthermore, since the parameter of the catalyst statistical model describing the relationship between the front air-fuel ratio and the rear equivalence ratio is updated to the latest state by system identification, even when the catalyst is deteriorated, the deterioration of the emission can be appropriately prevented, and the catalyst deterioration state can be diagnosed.

In addition, the internal combustion engine control device (ECU 28) of the present embodiment further includes a deterioration degree determination unit (deterioration degree determination unit 1508) that determines the degree of deterioration of the exhaust purification catalyst (catalyst 21) based on the parameters of the learned catalyst statistical model (catalyst statistical model 1503M). For example, the deterioration degree determination unit may output the catalyst deterioration diagnosis result based on the deterioration degree of the exhaust purification catalyst and the deterioration state assumed in the catalyst statistical model.

By determining the catalyst deterioration degree and outputting the catalyst deterioration diagnosis result in this manner, it is possible to notify the user of the deterioration or abnormality of the exhaust purification catalyst. Therefore, the user can take necessary measures such as repair or replacement of the exhaust purification catalyst.

<Modifications>

The present invention is not limited to the embodiments described above, and it goes without saying that various other application examples and modifications can be taken without departing from the gist of the present invention described in the claims.

For example, the above-described embodiments describe the configuration of the internal combustion engine control device in detail and specifically in order to describe the present invention in an easy-to-understand manner, and are not necessarily limited to those including all the components described above. In addition, it is also possible to add, replace, or remove other components for a part of the configuration of the above-described embodiment.

In addition, some or all of the above-described configurations, functions, processing units, and the like may be realized by hardware, for example, by designing with an integrated circuit. A field programmable gate array (FPGA), an application specific integrated circuit (ASIC), or the like may be used as the hardware.

Furthermore, in the flowcharts shown in FIGS. 19, 21, and 23, a plurality of processes may be executed in parallel or the processing order may be changed within a range not affecting the processing result.

REFERENCE SIGNS LIST 1 internal combustion engine
2 flow rate sensor
20 air-fuel ratio sensor
21 exhaust purification catalyst
22 oxygen sensor
28 ECU
31 control unit
31a CPU
1501 catalyst boundary condition calculation unit
1502 catalyst temperature calculation unit
1503 catalyst statistical model calculation unit
1503M catalyst statistical model
1504 rear oxygen sensor statistical model calculation unit
1504M rear oxygen sensor statistical model
1505 rear equivalence ratio calculation unit
1506 air-fuel ratio correction amount calculation unit
1507 system identification unit
1508 deterioration degree determination unit
1810 input nonlinear element
1820 linear transient model
1830 output nonlinear element

The invention claimed is:

1. An internal combustion engine control device comprising: an exhaust purification catalyst provided in an exhaust pipe of an internal combustion engine; an air-fuel ratio sensor disposed upstream of the exhaust purification catalyst; an oxygen sensor disposed downstream of the exhaust purification catalyst;
a downstream equivalence ratio calculation unit that calculates a catalyst downstream exhaust gas equivalence ratio using a catalyst statistical model that receives at least a detection value of the air-fuel ratio sensor as an input and outputs the catalyst downstream exhaust gas equivalence ratio;
an oxygen output calculation unit configured to calculate an output value of the oxygen sensor using an oxygen sensor statistical model in which the catalyst downstream exhaust gas equivalence ratio is input and the output value of the oxygen sensor is output;
a downstream equivalence ratio correction unit that corrects the catalyst downstream exhaust gas equivalence ratio calculated by the downstream equivalence ratio calculation unit based on the calculation result of the oxygen output calculation unit and the detection value of the oxygen sensor; and an air-fuel ratio control unit that controls the air-fuel ratio of the air-fuel mixture of the internal combustion engine based on the corrected catalyst downstream exhaust gas equivalence ratio and air-fuel ratio target value.

2. The internal combustion engine control device according to claim 1, further comprising:
a catalyst statistical model learning unit that learns a parameter of the catalyst statistical model based on a detection value of the air-fuel ratio sensor and the corrected catalyst downstream exhaust gas equivalence ratio.

3. The internal combustion engine control device according to claim 2, wherein
a sequential least squares algorithm is applied to the catalyst statistical model learning unit.

4. The internal combustion engine control device according to claim 2, wherein
the catalyst statistical model learning unit determines whether or not learning of the catalyst statistical model is possible based on any one of states of an operating state of the air-fuel ratio sensor and the oxygen sensor, a catalyst temperature state, a catalyst deterioration diagnosis state, and a diagnosis state of the air-fuel ratio sensor and the oxygen sensor, and stops learning of the catalyst statistical model when it is determined that learning is impossible.

5. The internal combustion engine control device according to claim 2, further comprising:
a deterioration degree determination unit that determines a degree of deterioration of the exhaust purification catalyst based on the learned parameter of the catalyst statistical model, wherein
the deterioration degree determination unit outputs a catalyst deterioration diagnosis result based on a degree of deterioration of the exhaust purification catalyst and a deterioration state assumed in the catalyst statistical model.

6. The internal combustion engine control device according to claim 2, wherein
the catalyst statistical model learning unit learns the parameter of the catalyst statistical model during fuel cut operation.

7. The internal combustion engine control device according to claim 1, wherein
a Kalman filter is applied to the downstream equivalence ratio correction unit.

8. The internal combustion engine control device according to claim 1, wherein
a hysteresis term is set in the catalyst statistical model, the hysteresis term reflecting a characteristic in which a response speed of an output is different between when an input is increased and when the input is decreased.

9. The internal combustion engine control device according to claim 8, wherein
the hysteresis term includes a term defined by a first input parameter that takes both a positive value and a negative value and a second input parameter defined by a product of an output parameter that takes a positive value and an absolute value of the first input parameter.

10. The internal combustion engine control device according to claim 1, wherein
a hysteresis term is set in the oxygen sensor statistical model, the hysteresis term reflecting a characteristic in which a response speed of an output is different between when an input is increased and when the input is decreased.

11. The internal combustion engine control device according to claim 1, wherein
a sigmoid function is set in an output element of the oxygen sensor statistical model.

12. The internal combustion engine control device according to claim 1, wherein
input parameters of the catalyst statistical model include at least a catalyst temperature and an exhaust gas flow rate.

13. The internal combustion engine control device according to claim 1, wherein
the downstream equivalence ratio correction unit determines whether or not to correct the catalyst downstream exhaust gas equivalence ratio based on any one of states of an operating state of the air-fuel ratio sensor and the oxygen sensor, a catalyst temperature state, a catalyst deterioration diagnosis state, and a diagnosis state of the air-fuel ratio sensor and the oxygen sensor, and stops the correction of the catalyst downstream exhaust gas equivalence ratio when it is determined that the correction is impossible.

* * * * *